United States Patent
Kalinin

(10) Patent No.: US 11,431,749 B2
(45) Date of Patent: Aug. 30, 2022

(54) METHOD AND COMPUTING DEVICE FOR GENERATING INDICATION OF MALICIOUS WEB RESOURCES

(71) Applicant: TRUST LTD., Moscow (RU)

(72) Inventor: Alexander Sergeevich Kalinin, Elektrostal (RU)

(73) Assignee: TRUST LTD., Moscow (RU)

( * ) Notice: Subject to any disclaimer, the term of this patent is extended or adjusted under 35 U.S.C. 154(b) by 410 days.

(21) Appl. No.: 16/659,687

(22) Filed: Oct. 22, 2019

(65) Prior Publication Data

US 2020/0213347 A1 Jul. 2, 2020

(30) Foreign Application Priority Data

Dec. 28, 2018 (RU) .......................... RU2018147431

(51) Int. Cl.
*H04L 9/40* (2022.01)
*G06F 16/953* (2019.01)
(Continued)

(52) U.S. Cl.
CPC ........ *H04L 63/1441* (2013.01); *G06F 16/212* (2019.01); *G06F 16/953* (2019.01); *G06N 20/00* (2019.01)

(58) Field of Classification Search
CPC . H04L 63/1441; G06F 16/953; G06F 16/212; G06N 20/00
See application file for complete search history.

(56) References Cited

U.S. PATENT DOCUMENTS

| | | | |
|---|---|---|---|
| 7,225,343 B1 | 5/2007 | Honig et al. | |
| 7,496,628 B2 | 2/2009 | Arnold et al. | |

(Continued)

FOREIGN PATENT DOCUMENTS

| | | |
|---|---|---|
| CN | 103491205 A | 1/2014 |
| CN | 104504307 A | 4/2015 |

(Continued)

OTHER PUBLICATIONS

Office Action with regard to the counterpart U.S. Appl. No. 16/247,870 dated Jun. 29, 2021.

(Continued)

*Primary Examiner* — Ghodrat Jamshidi
(74) *Attorney, Agent, or Firm* — BCF LLP

(57) ABSTRACT

A computing device for informing about malicious web resources and a method for informing about malicious web resources performed on this computing device are claimed. The claimed method includes performing operations wherein: obtaining references to a plurality of web resources; identifying malicious web resources in a specified set of web resources; establishing web resources associated with each of the identified malicious web resources; detecting malicious web resources in the identified related web resources; identifying at least one authorized entity associated with each of the identified malicious web resources; generating at least one report for at least one of the established authorized entities based on information about the detected malicious web resources associated with this authorized entity; sending each generated report to the appropriate authorized entity on the basis of the contact details of the authorized entity.

14 Claims, 3 Drawing Sheets

(51) Int. Cl.
   *G06N 20/00* (2019.01)
   *G06F 16/21* (2019.01)

(56) References Cited

U.S. PATENT DOCUMENTS

| | | | |
|---|---|---|---|
| 7,712,136 B2 | 5/2010 | Sprosts et al. | |
| 7,730,040 B2 | 6/2010 | Reasor et al. | |
| 7,854,001 B1* | 12/2010 | Chen | H04L 41/00 726/22 |
| 7,865,953 B1 | 1/2011 | Hsieh et al. | |
| 7,958,555 B1 | 6/2011 | Chen et al. | |
| 7,984,500 B1 | 7/2011 | Khanna et al. | |
| 8,132,250 B2 | 3/2012 | Judge et al. | |
| 8,151,341 B1 | 4/2012 | Gudov | |
| 8,219,549 B2 | 7/2012 | Gao et al. | |
| 8,255,532 B2 | 8/2012 | Smith-Mickelson et al. | |
| 8,260,914 B1 | 9/2012 | Ranjan | |
| 8,266,695 B1* | 9/2012 | Clay, IV | G06F 9/45529 713/189 |
| 8,285,830 B1 | 10/2012 | Stout et al. | |
| 8,402,543 B1 | 3/2013 | Ranjan et al. | |
| 8,448,245 B2 | 5/2013 | Banerjee et al. | |
| 8,532,382 B1 | 9/2013 | Ioffe | |
| 8,539,582 B1 | 9/2013 | Aziz et al. | |
| 8,555,388 B1 | 10/2013 | Wang et al. | |
| 8,561,177 B1 | 10/2013 | Aziz et al. | |
| 8,578,480 B2 | 11/2013 | Judge et al. | |
| 8,600,993 B1 | 12/2013 | Gupta et al. | |
| 8,612,463 B2 | 12/2013 | Brdiczka et al. | |
| 8,612,560 B2 | 12/2013 | Oliver et al. | |
| 8,625,033 B1 | 1/2014 | Marwood et al. | |
| 8,631,489 B2 | 1/2014 | Antonakakis et al. | |
| 8,635,696 B1 | 1/2014 | Aziz | |
| 8,650,080 B2 | 2/2014 | O'Connell et al. | |
| 8,660,296 B1 | 2/2014 | Ioffe | |
| 8,677,472 B1 | 3/2014 | Dotan et al. | |
| 8,762,537 B2 | 6/2014 | Alperovitch et al. | |
| 8,776,229 B1 | 7/2014 | Aziz | |
| 8,850,571 B2 | 9/2014 | Staniford et al. | |
| 8,856,239 B1 | 10/2014 | Oliver et al. | |
| 8,856,937 B1 | 10/2014 | Wüest et al. | |
| 8,898,787 B2* | 11/2014 | Thompson | G06F 21/55 726/24 |
| 8,972,412 B1 | 3/2015 | Christian et al. | |
| 8,984,640 B1 | 3/2015 | Emigh et al. | |
| 9,026,840 B1 | 5/2015 | Kim | |
| 9,060,018 B1 | 6/2015 | Yu et al. | |
| 9,100,335 B2 | 8/2015 | Oliver et al. | |
| 9,210,111 B2 | 12/2015 | Chasin et al. | |
| 9,215,239 B1 | 12/2015 | Wang et al. | |
| 9,253,208 B1 | 2/2016 | Koshelev | |
| 9,300,686 B2 | 3/2016 | Pidathala et al. | |
| 9,330,258 B1 | 5/2016 | Satish et al. | |
| 9,338,181 B1 | 5/2016 | Burns et al. | |
| 9,357,469 B2 | 5/2016 | Smith et al. | |
| 9,456,000 B1 | 9/2016 | Spiro et al. | |
| 9,584,541 B1* | 2/2017 | Weinstein | H04L 29/06884 |
| 9,654,593 B2 | 5/2017 | Garg et al. | |
| 9,723,344 B1 | 8/2017 | Granström et al. | |
| 9,736,178 B1 | 8/2017 | Ashley | |
| 9,749,336 B1 | 8/2017 | Zhang et al. | |
| 9,847,973 B1 | 12/2017 | Jakobsson et al. | |
| 9,875,355 B1* | 1/2018 | Williams | H04L 63/1408 |
| 9,888,019 B1 | 2/2018 | Pidathala et al. | |
| 9,917,852 B1 | 3/2018 | Xu et al. | |
| 9,934,376 B1 | 4/2018 | Ismael | |
| 10,044,748 B2 | 8/2018 | Dagon et al. | |
| 10,129,194 B1 | 11/2018 | Jakobsson | |
| 10,270,744 B2 | 4/2019 | Yu et al. | |
| 10,587,646 B2 | 3/2020 | Fakeri-Tabrizi et al. | |
| 10,715,543 B2 | 7/2020 | Jakobsson | |
| 2002/0161862 A1 | 10/2002 | Horvitz | |
| 2003/0009696 A1 | 1/2003 | Bunker et al. | |
| 2006/0074858 A1 | 4/2006 | Etzold et al. | |
| 2006/0107321 A1 | 5/2006 | Tzadikario | |
| 2006/0224898 A1 | 10/2006 | Ahmed | |
| 2006/0253582 A1 | 11/2006 | Dixon et al. | |
| 2007/0019543 A1 | 1/2007 | Wei et al. | |
| 2007/0239999 A1 | 10/2007 | Honig et al. | |
| 2009/0138342 A1 | 5/2009 | Otto et al. | |
| 2009/0281852 A1 | 11/2009 | Abhari et al. | |
| 2009/0292925 A1 | 11/2009 | Meisel | |
| 2010/0011124 A1 | 1/2010 | Wei et al. | |
| 2010/0037314 A1 | 2/2010 | Perdisci et al. | |
| 2010/0076857 A1 | 3/2010 | Deo et al. | |
| 2010/0095377 A1 | 4/2010 | Krywaniuk | |
| 2010/0115620 A1 | 5/2010 | Alme | |
| 2010/0115621 A1 | 5/2010 | Staniford et al. | |
| 2010/0191737 A1 | 7/2010 | Friedman et al. | |
| 2010/0205665 A1 | 8/2010 | Komili et al. | |
| 2010/0235918 A1 | 9/2010 | Mizrahi et al. | |
| 2011/0222787 A1 | 9/2011 | Thiemert et al. | |
| 2012/0030293 A1 | 2/2012 | Bobotek | |
| 2012/0079596 A1 | 3/2012 | Thomas et al. | |
| 2012/0087583 A1 | 4/2012 | Yang et al. | |
| 2012/0158626 A1 | 6/2012 | Zhu et al. | |
| 2012/0209987 A1* | 8/2012 | Rhinelander | G06Q 30/02 709/224 |
| 2012/0233656 A1 | 9/2012 | Rieschick et al. | |
| 2012/0291125 A1 | 11/2012 | Maria | |
| 2013/0086677 A1 | 4/2013 | Ma et al. | |
| 2013/0103666 A1 | 4/2013 | Sandberg et al. | |
| 2013/0111591 A1 | 5/2013 | Topan et al. | |
| 2013/0117848 A1 | 5/2013 | Golshan et al. | |
| 2013/0191364 A1 | 7/2013 | Kamel et al. | |
| 2013/0263264 A1 | 10/2013 | Klein et al. | |
| 2013/0297619 A1 | 11/2013 | Chandrasekaran et al. | |
| 2013/0340080 A1 | 12/2013 | Gostev et al. | |
| 2014/0033307 A1 | 1/2014 | Schmidtler | |
| 2014/0058854 A1 | 2/2014 | Ranganath et al. | |
| 2014/0082730 A1 | 3/2014 | Vashist et al. | |
| 2014/0173287 A1 | 6/2014 | Mizunuma | |
| 2014/0181975 A1* | 6/2014 | Spernow | G06F 21/568 726/23 |
| 2014/0310811 A1 | 10/2014 | Hentunen | |
| 2015/0007250 A1 | 1/2015 | Dicato, Jr. et al. | |
| 2015/0049547 A1 | 2/2015 | Kim | |
| 2015/0067839 A1 | 3/2015 | Wardman et al. | |
| 2015/0163242 A1 | 6/2015 | Laidlaw et al. | |
| 2015/0170312 A1 | 6/2015 | Mehta et al. | |
| 2015/0200963 A1 | 7/2015 | Geng et al. | |
| 2015/0220735 A1 | 8/2015 | Paithane et al. | |
| 2015/0295945 A1 | 10/2015 | Canzanese et al. | |
| 2015/0363791 A1 | 12/2015 | Raz et al. | |
| 2015/0381654 A1 | 12/2015 | Wang et al. | |
| 2016/0036837 A1 | 2/2016 | Jain et al. | |
| 2016/0036838 A1 | 2/2016 | Jain et al. | |
| 2016/0044054 A1 | 2/2016 | Stiansen et al. | |
| 2016/0055490 A1 | 2/2016 | Keren et al. | |
| 2016/0065595 A1 | 3/2016 | Kim et al. | |
| 2016/0112445 A1 | 4/2016 | Abramowitz | |
| 2016/0127907 A1 | 5/2016 | Baxley et al. | |
| 2016/0149943 A1 | 5/2016 | Kaloroumakis et al. | |
| 2016/0191243 A1 | 6/2016 | Manning | |
| 2016/0205122 A1 | 7/2016 | Bassett | |
| 2016/0205123 A1 | 7/2016 | Almurayh et al. | |
| 2016/0226894 A1 | 8/2016 | Lee et al. | |
| 2016/0253679 A1 | 9/2016 | Venkatraman et al. | |
| 2016/0261628 A1 | 9/2016 | Doron et al. | |
| 2016/0267179 A1 | 9/2016 | Mei et al. | |
| 2016/0285907 A1 | 9/2016 | Nguyen et al. | |
| 2016/0294862 A1* | 10/2016 | Tao | H04L 63/1441 |
| 2016/0306974 A1 | 10/2016 | Turgeman et al. | |
| 2016/0352772 A1* | 12/2016 | O'Connor | H04L 63/1483 |
| 2016/0359679 A1 | 12/2016 | Parandehgheibi et al. | |
| 2017/0034211 A1 | 2/2017 | Buergi et al. | |
| 2017/0111377 A1 | 4/2017 | Park et al. | |
| 2017/0134401 A1 | 5/2017 | Medvedovsky et al. | |
| 2017/0142144 A1 | 5/2017 | Weinberger et al. | |
| 2017/0149813 A1 | 5/2017 | Wright et al. | |
| 2017/0200457 A1 | 7/2017 | Chai et al. | |
| 2017/0230401 A1 | 8/2017 | Ahmed et al. | |
| 2017/0244735 A1 | 8/2017 | Visbal et al. | |
| 2017/0250972 A1 | 8/2017 | Ronda et al. | |

(56) References Cited

U.S. PATENT DOCUMENTS

| | | | |
|---|---|---|---|
| 2017/0272471 | A1 | 9/2017 | Veeramachaneni et al. |
| 2017/0279818 | A1 | 9/2017 | Milazzo et al. |
| 2017/0286544 | A1 | 10/2017 | Hunt et al. |
| 2017/0289187 | A1 | 10/2017 | Noel et al. |
| 2017/0295157 | A1 | 10/2017 | Chavez et al. |
| 2017/0295187 | A1 | 10/2017 | Havelka et al. |
| 2017/0324738 | A1 | 11/2017 | Hari et al. |
| 2017/0346839 | A1 | 11/2017 | Peppe et al. |
| 2018/0007070 | A1 | 1/2018 | Kulkarni et al. |
| 2018/0012021 | A1 | 1/2018 | Volkov |
| 2018/0012144 | A1 | 1/2018 | Ding et al. |
| 2018/0034779 | A1 | 2/2018 | Ahuja et al. |
| 2018/0063190 | A1 | 3/2018 | Wright et al. |
| 2018/0096153 | A1 | 4/2018 | Dewitte et al. |
| 2018/0115573 | A1 | 4/2018 | Kuo et al. |
| 2018/0137150 | A1* | 5/2018 | Osesina ............... G06F 16/215 |
| 2018/0227324 | A1* | 8/2018 | Chambers ........... G06F 16/9024 |
| 2018/0268464 | A1 | 9/2018 | Li |
| 2018/0307832 | A1 | 10/2018 | Ijiro et al. |
| 2018/0309787 | A1 | 10/2018 | Evron et al. |
| 2019/0089737 | A1 | 3/2019 | Shayevitz et al. |
| 2019/0207973 | A1 | 7/2019 | Peng |
| 2019/0373005 | A1 | 12/2019 | Bassett |
| 2020/0092326 | A1* | 3/2020 | Prakash ............... H04L 63/1483 |
| 2020/0106809 | A1* | 4/2020 | Raj ...................... H04L 65/1006 |
| 2020/0134702 | A1 | 4/2020 | Li |
| 2020/0145435 | A1* | 5/2020 | Chiu ...................... H04L 63/14 |

FOREIGN PATENT DOCUMENTS

| | | |
|---|---|---|
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2668710 C1 | 10/2018 |
| RU | 2670906 C9 | 12/2018 |
| RU | 2681699 C1 | 3/2019 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |

OTHER PUBLICATIONS

Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.
English Translation of CN106713312, © Questel—FAMPAT, Jul. 17, 2019.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion with regard to the counterpart SG Patent Application No. 10201900339Q.
Invitation to Respond to Written Opinion with regard to the counterpart SG Patent Application No. 10201901079U.
Invitation to Respond to Written Opinion with regard to the counterpart SG Patent Application No. 10201900335P.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Office Action with regard to the counterpart U.S. Appl. No. 15/707,641 dated Apr. 25, 2019.
European Search Report with regard to the counterpart EP Patent Application No. EP17210904 completed May 16, 2018.
Office Action with regard to the counterpart U.S. Appl. No. 16/261,854 dated Oct. 21, 2019.
Office Action received with regard to the counterpart U.S. Appl. No. 15/858,032 dated Apr. 6, 2020.
Office Action with regard to the counterpart U.S. Appl. No. 15/858,013 dated Nov. 22, 2019.
Office Action with regard to the counterpart U.S. Appl. No. 16/270,341 dated May 27, 2020.
Notice of Allowance with regard to the counterpart U.S. Appl. No. 15/858,013 dated May 8, 2020.
English Abstract of RU107616 retrieved on Espacenet on Jul. 3, 2017.
European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 dated Jun. 1, 2017.
Search Report with regard to the counterpart RU Patent Application No. 2018101760 completed Jun. 22, 2018.

(56) References Cited

OTHER PUBLICATIONS

Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 18, 2017.
Prakash et al., "PhishNet: Predictive Blacklisting to Detect Phishing Attacks", Infocom, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
Notice of Allowance with regard to the counterpart U.S. Appl. No. 15/858,013 dated Jun. 10, 2020.
Office Action with regard to the counterpart U.S. Appl. No. 16/659,697 dated May 12, 2021.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, Noss, pp. 1-17 (Year: 2005)—in the Notice of Allowance with regard to the counterpart U.S. Appl. No. 15/707,641.
Notice of Allowance with regard to the counterpart U.S. Appl. No. 15/858,032 dated Jul. 30, 2020.

* cited by examiner

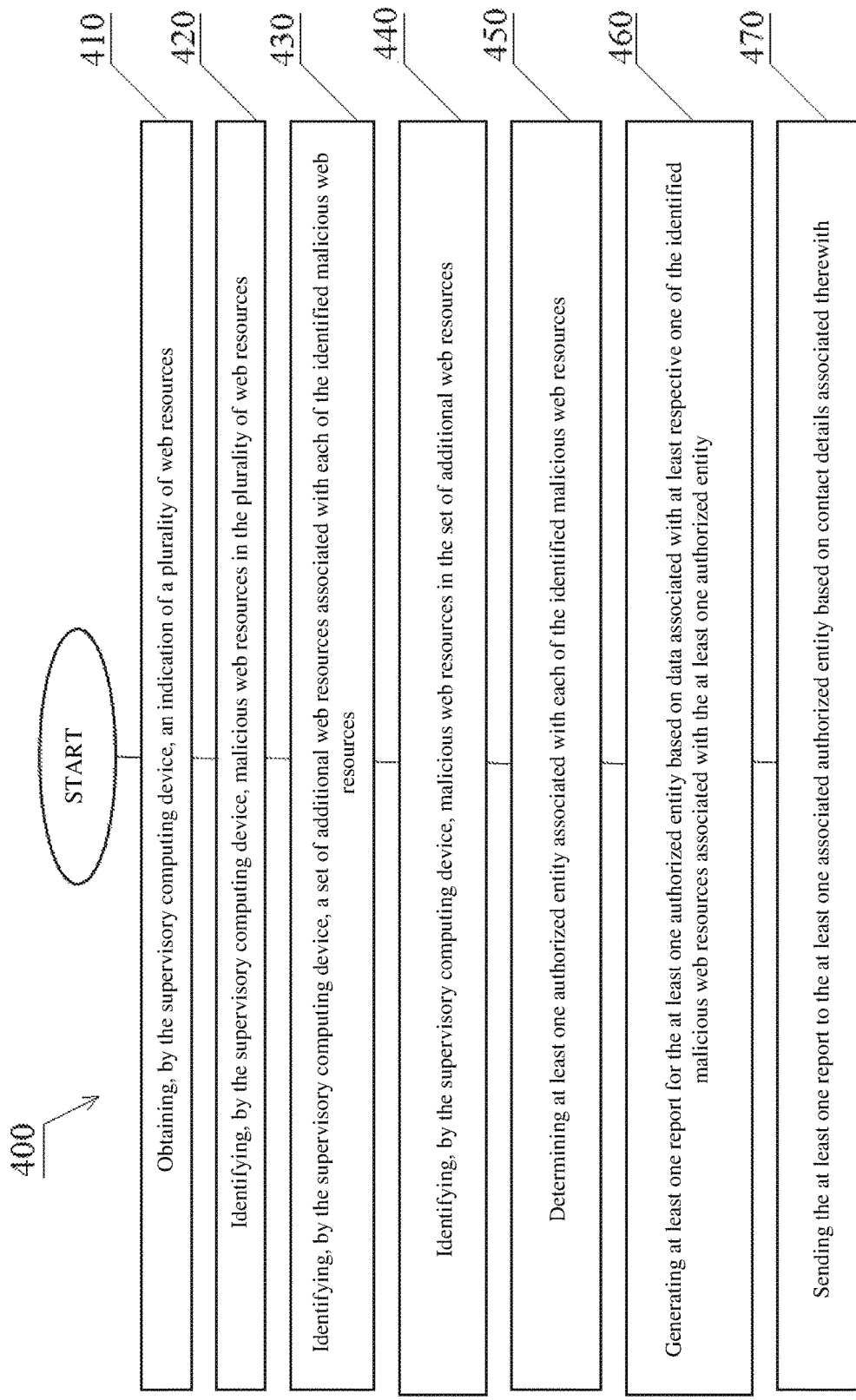

METHOD AND COMPUTING DEVICE FOR GENERATING INDICATION OF MALICIOUS WEB RESOURCES

CROSS-REFERENCE

The present application claims priority to Russian Patent Application No. 2018147431, entitled "METHOD AND COMPUTING DEVICE FOR INFORMING ABOUT MALICIOUS WEB RESOURCES" (as translated from Russian-language title appearing on the application as filed with the Russian Patent Office: "СПОСОБ И ВЫЧИСЛИТЕЛЬНОЕ УСТРОЙСТВО ДЛЯ ИНФОРМИРОВАНИЯ О ВРЕДОНОСНЫХ ВЕБ-РЕСУРСАХ"), filed on Dec. 28, 2018, the entirety of which is incorporated herein by reference.

FIELD

This technique relates to the field of information security, in particular to a method and computing device for informing about malicious web resources.

BACKGROUND

In order to place a web resource on the Internet, it is necessary to upload its files to a web server of the hosting provider, which is constantly connected to the Internet and which runs special software necessary for processing requests to a web resource. When a hosting provider is contacted, the owner of the web resource receives a personal account, and the web resource receives an IP address issued by this hosting provider, and the issued IP address is assigned to the account issued to the owner of the web resource. Thus, based on the IP address of the web resource, it is possible at least to determine the hosting provider that issued the account using this IP address. It shall be noted that hosting providers usually provide their services under certain conditions, wherein the hosting provider may, among other things, suspend provision of its services if a web resource with malicious and/or illegal content is hosted on its web server, which implies blocking such a malicious web resource by the hosting provider by its IP address, as a result of which this web resource is no longer accessible to the Internet users.

For the convenience of storing the address space of a web resource and enabling the transition from one hosting provider to another hosting provider without the need to change a single web resource pointer ("URL"), by entering which in the address line of the web browser, the user can access specified web resource, the web resource owner can use the capabilities of the domain name system, wherein such a web resource can be assigned a domain name that is registered with a domain name registrar, at the same time, any combination of letters and numbers that does not violate the rules of the selected domain zone can be chosen as a registered domain name. To automatically convert the registered domain name of a web resource to its IP address, usually specified when registering a domain name, the DNS servers are used that store information about the compliance of certain domain names with IP addresses of web resources issued by hosting providers. It shall be noted that domain name registrars, similarly to hosting providers, also usually provide their services under certain conditions, wherein the domain name registrar may, among other things, block a domain name registered by this domain name registrar, if, for example, it will learn that this domain name belongs to a web resource with malicious and/or illegal content. Thus, if the registrar blocks the domain names of a specific domain name after a certain period of time, the domain name of the web resource entered by the user in the address line of the browser will not be converted to an IP address, as a result of which connection to the requested web resource will not occur (i.e., the user will not be able to access the web resource), and the browser will give the user an error message, such as, for example, the message "Could not find the IP address of the server".

Thus, one of the most significant reasons for suspending provision of the above services by a hosting provider and/or domain name registrar is that they will receive information that their associated web resource is malicious, that is, comprises malicious and/or illegal content.

In order to identify malicious web resources and to send notifications to authorized entities about detected malicious web resources, various intelligent systems are used for their subsequent blocking.

One of illustrative examples of such an intelligent system is described in KR 101514984 B1 (published on Apr. 24, 2015; G06F 21/56).

In particular, the patent KR 101514984 discloses a system for detecting malicious code distributed by web pages. The system under KR 101514984 is configured to connect to web pages of various web resources for the implementation of various user actions, to identify any behavioral model associated with the spread of malicious code, and to send a notification to the hosting server that hosts this malicious code, for ensuring that it can take the necessary measures before the distribution of this malicious code in accordance with the identified behavioral model.

In another patent KR20070049514 (published on May 11, 2007; G06F 11/00), a system claimed for detecting malicious code comprises a block for obtaining references to many web resources; database for storing information about known malicious code; a search unit to search for malicious code among the received references by identifying whether the suspicious code matches the malicious code, information about which is stored in the database; and a notification block for sending a notification about the presence of malicious code to a web resource on which this malicious code was found by the search block, for later removal of the source code for generation of html documents, a program, an image, a pop-up window, etc., embedded in suspicious code, or blocking the domain through which the malicious code is distributed.

It shall be noted that the known information systems only allow to send a separate notification about one malicious web resource detected during a sequential check of the analyzed web resources for maliciousness to one authorized entity associated with this malicious web resource; however, there is a possibility that such notification will be ignored by an authorized entity, with the result that such a web resource will continue to work for the abusers, distributing malicious and/or illegal content on the web. It shall be noted that the known information systems do not use means and mechanisms that allow simultaneously informing a wide range of authorized entities that may influence the decision to block a web resource with malicious and/or illegal content or which may make such a decision about malicious web-resources with similar signs of suspicion, having similar malicious activity and/or belonging to the same abuser or the same group of abusers.

Thus, there is an evident need to further improve the means for informing about malicious web resources, in particular, to improve the effectiveness of informing authorized entities about the identified web resources with malicious and/or illegal content.

Consequently, technical problem solved by this technique is the creation of improved means for informing about malicious web resources, in which the above-mentioned disadvantage of known information tools is at least partially eliminated, consisting of the low efficiency of informing authorized entities in the identified web resources with malicious and/or illegal content.

SUMMARY

In accordance with one broad aspect of the present technology, there is provided a method of generating an indication of a malicious web resource running on a network computing device, the method executable by a supervisory computing device. The method comprises: obtaining, by the supervisory computing device, an indication of a plurality of web resources; identifying, by the supervisory computing device, malicious web resources in the plurality of web resources, identifying, by the supervisory computing device, a set of additional web resources associated with each of the identified malicious web resources, identifying, by the supervisory computing device, malicious web resources in the set of additional web resources, determining at least one authorized entity associated with each of the identified malicious web resources; generating at least one report for the at least one authorized entity based on data associated with at least respective one of the identified malicious web resources associated with the at least one authorized entity; sending the at least one report to the at least one associated authorized entity on the basis of contact details associated therewith.

In some implementations of the method, the determining the at least one authorized entity associated with each of the malicious web resources comprises determining at least one of: an owner, an administrator, a hosting provider and a domain name registrar associated therewith.

In some implementations of the method, the method further comprises determining a type of threat associated with each identified malicious web resource, the type of threat being selected from a pre-determined set of types of threats.

In some implementations of the method, the method further comprising, during the generating the at least one report, using a template from a pre-determined set of report templates, each template corresponding to at least one of: one of the pre-determined types of threats and one of the established authorized entities.

In some implementations of the method, a number of reports generated for each authorized entity corresponds to a number of identified types of threats.

In some implementations of the method, the method further comprises generating an evidence document as part of each report, the evidence document for confirming maliciousness of each web resource.

In some implementations of the method, the identifying malicious web resources comprises determining if a given indication of a given one of the plurality of web resources matches a known malicious reference.

In some implementations of the method, the identifying, by the supervisory computing device, malicious web resources further comprises executing at least one of: analyzing a domain name of the given one of the plurality of web resources for maliciousness using at least one method for analyzing domain names, obtaining at least one file from the given one of the plurality of web resources to execute a maliciousness analysis using at least one method of analyzing files; and obtaining an html-code of the given one of the plurality of web resources to execute a maliciousness analysis using at least one method of analyzing html-code.

In some implementations of the method, the at least one method of analyzing domain names comprises comparing the domain name with known malicious domain names.

In some implementations of the method, the at least one method of analyzing files comprises generating a hash sum associated with the at least one file and comparing the hash sum with a hash sum of one of the known malicious files.

In some implementations of the method, the at least one method of analyzing html-code comprises conducting a search in the html-code for specific keywords indicating malicious nature of the web resource.

In some implementations of the method, the identifying the set of additional web resources associated with each of the identified malicious web resources comprises, for a given pair of web resources including at least one of the set of additional web resources and a respective one of the identified malicious web resources associated therewith: determining whether domain names of the given pair of web resources have a similar spelling; determining whether the domain names are registered to a same entity; determining whether same registrant personal data is specified for the domain names of the given pair of web resources; determining whether the domain names of the given pair of web resources are located at a same IP address; and determining whether links corresponding to the given pair of web resources have at least a similar uniform locator.

In some implementations of the method, the identifying the set of additional web resources associated with each of the identified malicious web resources comprises: creating a mathematical model in a form of a graph, wherein: vertices of the graph correspond to a first web resource and a second web resource, graph edges are the links between the first web resource and the second web resource based on a web resource parameter common between the first web resource and the second web resource, and wherein a number of links based on the web resource parameter common between the first web resource and the second web resources is limited by a predetermined threshold value; assigning weights to the links between the first web resource and the second web resource by using a machine learning algorithm, based on the web resource parameter common between the first web resource and the second web resource; determining a link coefficient as a ratio of (i) the number of links based on the web resource parameter common between the first web resource and the second web resources and (ii) the weight of each link based on the web resource parameter common between the first web resource and the second web resources; and removing links between the first web resource and the second web resource responsive to the link coefficient being lower than a predetermined threshold value.

In some implementations of the method, the identifying the set of additional web resources associated with each of the identified malicious web resources comprises: sending a request to at least one source of indications of malicious web resources to obtain therefrom at least one indication of a web resource; receiving messages from at least one third-party computing device that is configured to retrieve the at least one indication of the web resource; receiving messages from at least one third-party mobile device that is configured to retrieve the at least one indication of the web resource; executing search queries in at least one search engine using a pre-determined list of search keywords to identify contextual advertising in search results generated in response to each request in each of the search engines, such that to extract the at least one indication to the web resource used in the contextual advertising.

In accordance with another broad aspect of the present technology, there is provided a computing device for generating an indication of malicious web resources. The computing device comprises: a memory for storing machine-readable instructions and at least one computing processor. The device is configured to execute computer-readable instructions, which instructions, when executed, are configured to cause the at least one computing processor to execute the above-described method.

In accordance with yet another broad aspect of the present technology, there is provided a method of informing about the malicious nature of web resources according to this technique is claimed, performed on a computing device, wherein according to this method: references to many web resources are obtained; malicious web resources in a specified set of web resources are identified; web resources associated with each of the identified malicious web resources are determined; malicious web resources among a set of identified related web resources are established; at least one authorized entity associated with each of the identified malicious web resources is determined; at least one report for at least one of the established authorized entities based on information about the detected malicious web resources associated with this authorized entity is generated; each generated report is sent to the appropriate authorized entity on the basis of the contact details of this authorized entity.

In one of embodiments of this technique, in order to obtain references to a set of web resources, at least one of the following operations are performed, wherein: a request is sent to at least one reference source in order to obtain at least one reference to a web resource from it; messages are received from at least one computing device, ensuring their processing to retrieve at least one reference to a web resource; messages are received from at least one mobile device ensuring their processing to retrieve at least one reference to a web resource; and search queries are entered into at least one search engine using a specific list of keywords to identify contextual advertising in search results received in response to each search query in each of these search engines, ensuring that at least one reference to a web resource is retrieved from the identified contextual advertising.

In another embodiment of this technique, in order to establish related web resources (i.e. to identify a web resource parameter common to two or more web resources), at least one of the following is determined: whether the domain names of web resources have a similar spelling; whether the domain names are registered to the same person; whether the same registrant personal data is specified for registered domain names of web resources; whether the domain names of web resources are located at the same IP address; and whether the references corresponding to the web resources have the same or similar single pointer to the web resource "URL".

In another embodiment of this technique, in order to establish communication of web resources, at least the following operations is performed, wherein: a mathematical model in the form of a graph is created, wherein the vertices of the created graph correspond to at least the first web resource and to at least the second web resource, and the graph edges represent the references between at least the first web resource and at least the second web resource by at least one web resource parameter that is common for at least the first web resource and for at least the second web resource, wherein the number of references per parameter of the web resource between one first web resource and the second web resources is limited by a specified threshold value; by means of a known machine learning algorithm, the weights are assigned to the references between at least the first web resource and the second web resource based on the parameter of the first web resource and the second web resource; the link coefficient is determined as the ratio of the number of links one parameter of a web resource between one first web resource and second web resources and the weight of each link under one parameter of a web resource between the first web resource and the second web resources; and the links between at least the first web resource and at least the second web resource are deleted if the value of the determined communication coefficient is less than the predetermined threshold value.

In some embodiments of this technique, in order to identify malicious web resources, it is established whether each resulting reference is at least partially related to one of the known malicious references.

i. In other embodiments of this technique, in order to identify malicious web resources, in addition to the operation, wherein it is established whether each received reference at least partially coincides with one of the known malicious references, at least one of the following operations is performed, wherein: the domain name of the web resource is analyzed for maliciousness using at least one method of the domain names analysis; from a web resource at least one file is obtained for its analysis for maliciousness using at least one file analysis method; and the html-code of the web resource is obtained for its analysis for maliciousness using at least one html-code analysis method.

In some other embodiments of this technique, when analyzing the domain name of a web resource for maliciousness, it is further established whether this analyzed domain name matches one of the known malicious domain names.

In other embodiments of this technique, when analyzing a file received from a web resource, the hash sum of the analyzed file received from the web resource is additionally calculated and it is established whether the calculated hash sum of the analyzed file matches the hash sum of one of the known malicious files.

In other embodiments of this technique, when analyzing the obtained html-code of a web resource, search is done in the specified html-code for specific keywords indicating the malicious nature of the web resource.

According to one of the embodiments of this technique, when establishing authorized entities associated with each of the identified malicious web resources, the owner, administrator, hosting provider, and/or domain name registrar associated with this malicious web resource is determined.

According to another embodiment of the this technique, the claimed method may include an additional step, wherein a threat type is set from a predetermined set of threat types for each detected malicious web resource, and when generating each report, a template from a predetermined set of report templates is used, with each template corresponding to one of the identified types of threats and one of the established authorized entities.

In another embodiment of this technique, the number of reports generated for each authorized entity may correspond to the number of identified types of threats.

In another embodiment of this technique, evidence of the maliciousness of each web resource, the details of which are comprised in this report, may be additionally added to each generated report.

BRIEF DESCRIPTION OF THE DRAWINGS

Accompanying drawings, which are provided for a better understanding of the non-limiting embodiments of the present technology are included in the present application.

In the drawings:

FIG. 3 depicts a flowchart diagram of a method for informing about malicious web resources, according to the non-limiting embodiments of the present technology.

DETAILED DESCRIPTION

Some examples embodiments of the present technology are described below, and it shall not be assumed that the following description defines or limits the scope of the present technology.

System for Informing about Malicious Web Resources

Figure 1:
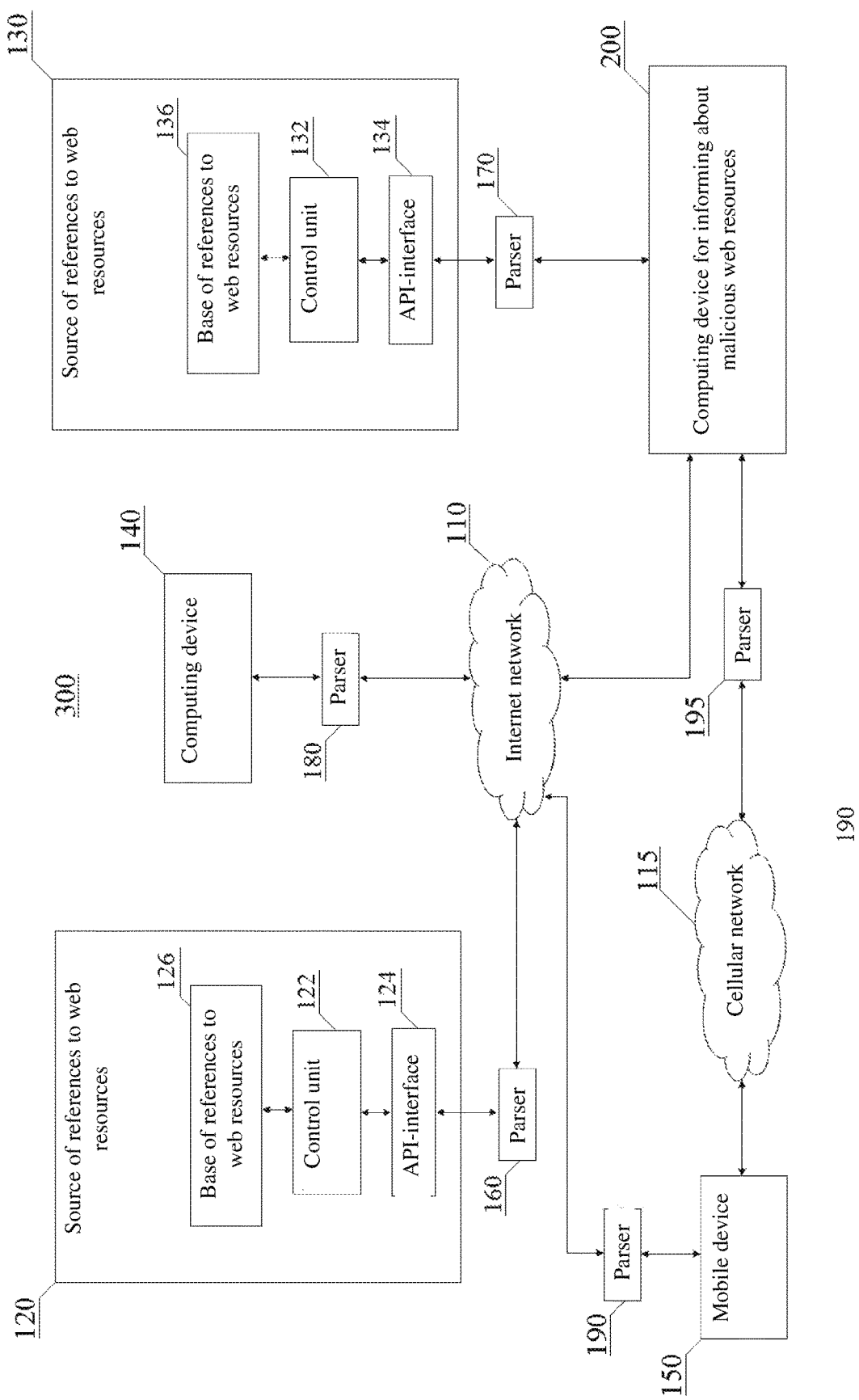
FIG. 1 schematically depicts a system for informing about malicious web resources, according to the non-limiting embodiments of the present technology.

FIG. 1 schematically depicts a system 300 for informing about malicious web resources, according to the non-limiting embodiments of the present technology. The system 300 comprises a computing device 200 for informing about malicious web resources, a reference source 120 to web resources comprising references (depicted at 80) to potentially malicious web resources, a reference source 130 to web resources, comprising references to potentially malicious web resources, as well as a computing device 140, a mobile device 150 and an Internet network 110.

In some non-limiting embodiments of the present technology, a reference source 120 to web resources may be an antiphishing.org site with references to known malicious web resources, and reference source 130 to web resources may be an antifraud.org site with the references to known malicious web resources. In these embodiments, all data streams transmitted from the reference source 120, and all data streams transmitted from the reference source 130 shall be associated respectively with a unique identifier assigned to the reference source 120 and a unique identifier assigned to the reference source 130, wherein the wherein computing device 200 described below shall be pre-programmed or configured to identify data streams from such sources of references, in particular from sources of 120, 130 references, based on their unique identifiers comprised in these data streams and previously known to computing device 200.

The reference source 120 comprises, inter alia, a control block 122, an API-interface 124 that provides ability to interact with the control block 122, and a reference base 126 including references to web resources, which stores, for example, references to web resources collected from third-party sources that comprise potentially malicious and/or illegal content, and supporting information that attributes these references.

The reference source 130 also comprises, inter alia, a control block 132, an API-interface 134 that provides ability to interact with the control block 132, and a reference base 136 to web resources, which stores, for example, references to web resources collected from third-party sources with potentially malicious and/or illegal content, and supporting information that attributes these references.

In the non-limiting embodiments of the present technology, the computing device 200 is connected to the reference source 120 and the reference source 130, respectively, through a parser 160, configured to connect to the API-interface 124 of the source of 120 references and pre-configured to work with it, and a parser 170, configured to connect to the API-interface 134 of the reference source 130 and pre-configured to work with it, wherein the parser 160 is configured to communicate with the computing device 200 using the Internet network 110, and the parser 170 is configured to communicate directly with the computing device 200 by virtue of use any wire-based communication link (not depicted), for example. It should be noted that, according to the non-limiting embodiments of the present technology, each of the API-interface 124 and the API-interface 134 may have its own command syntax, so the parser 160 associated with the API-interface 124 may be pre-programmed to receive and process the command syntax of the API-interface 124, and the parser 170 associated with API-interface 134, may be pre-programmed in a similar way to receive and process the command syntax of the API-interface 134, wherein setting the parser 160 and the parser 170 to work with the API-interface 124 and the API-interface 134, respectively, occurs during the initial connection of the computing device 200 to the sources of 120, 130 references. It should be noted that each of the parsers 160, 170 can be implemented as a separate server or other known computing device.

In the non-limiting embodiments of the present technology, the computing device 200 is configured to send requests to each of the reference sources of 120, 130 For example, the computing device 200 may send requests to the reference sources 120, 130 to receive at least some references to potentially malicious web resources, all references to potentially malicious web resources, or only references to potentially malicious web resources stored in the reference base 126 or in the reference base of 136, respectively, for a given period of time. Due to the use of the parsers 160, 170 preconfigured to work respectively with the API-interfaces 124, 134, respectively, requests directed by the computing device 200 to the reference sources 120, 130 will comprise commands that are understandable respectively for the control blocks 122, 132, with the result that the control blocks 122, 132 will be able to properly process and respond to these requests, in particular, transfer the requested references to potentially malicious web resources to the computing device 200 from which these requests were received.

In particular, in response to received requests, the control blocks 122, 132 may be configured to have access to the reference base 126 and the reference base 136, respectively, ensuring that they retrieve the requested references to potentially malicious web resources (also referred to in this document as potentially malicious references) and transmission, by means of the API-interfaces 124, 134, extracted potentially malicious references, respectively, to the parsers 160, 170, wherein the parser 160 is configured to process an output data stream from API-interface 124 to extract therefrom potentially malicious references requested from reference source 120; and the parser 170 is configured to process an output data stream from the API-interface 134 to extract therefrom potentially malicious references requested from the reference source 130. It should be noted that to extract the necessary references to web resources from the processed data stream, each of the parsers 160, 170 may use a corresponding regular expression from a set of regular expressions. In particular, the output data stream from any of the API-interfaces 124, 134 comprise both potentially malicious references themselves and identification data describing them. For example, the identification data may include a date and a time of that references to the web resources were added in one of the reference bases, reference source identification data and/or any other necessary attributes of these references. The output data stream from any of the API-interfaces 124, 134 is typically represented as a character string with a specified description format, which is divided into structural elements using a predefined character, such as, but not limited to, "#" (hash character), wherein the writing format of such a string of characters is known to the parsers 160, 170, due to the fact that they have been pre-programmed or configured to work with the corresponding one of API-interfaces 124, 134. In particular, the parsers 160, 170 must know a keyword, a key symbol or a key label indicating the presence of the reference following it, and other key words/symbols/labels commonly used in the resulting character strings to indicate the presence of some other identifying information following such keywords. When these character strings are received from the API-interfaces 124, 134, the parsers 160, 170, respectively, extract from those received strings, each being divided into a known set of structural elements, potentially malicious references to web resources, and at least some of the identification data, describing these potentially malicious references, ensuring that the retrieved potentially malicious references to web resources are transferred to the computing device 200 for their subsequent analysis, features of which will be described below.

In the case of sending to one of the reference sources 120, 130 a request to transfer to the computing device 200 potentially malicious references saved in the reference base 126 and in the reference base 136, respectively, for a given period of time, for example, all recently saved potentially malicious references starting from a certain point in time, for example, last few minutes, hours, days, weeks, months, etc. depending on the tasks, wherein such requested potentially malicious references are installed, for example, using the readings of the system clock of the corresponding source of references, in accordance with which, among other things, each of the saved potentially malicious references is set.

In some non-limiting embodiments of the present technology, the computing device 200 may be configured to connect directly to each of the reference sources 120, 130 with provision of direct access, to their reference bases 126, 136, respectively to extract therefrom potentially malicious references for their subsequent processing by the computing device 200, the features of which are described below.

In other non-limiting embodiments of the present technology, the parsers 160, 170 may be both connected with a possibility of data exchange with computing device 200 using the Internet network 110.

In yet other non-limiting embodiments of the present technology, the parsers 160, 170 can both be connected to the computing device 200 by virtue of using any wire-based communication link (not depicted).

In yet further other non-limiting embodiments of the present technology, each of the reference sources 120, 130 can be configured to exchange data with parsers 160, 170 using the Internet network 110, while the parsers 160, 170 themselves are connected to the computing device 200 by virtue of using any wire-based communication link (not depicted).

The computer device 140, which may be represented, according to the non-limiting embodiments of the present technology, by a desktop computer, laptop, server, etc., is configured to communicate with the computing device 200 via a parser 180 by a wire-based communication link (not depicted), with a possibility of sending e-mails thereto, for example, to an e-mail address associated with the parser 180, wherein the transmitted electronic messages have the specified description format, similarly to the above output data streams of the API-interfaces 124, 134. The parser 180 is pre-programmed or configured to work with the computing device 140, so that the parser 180 receives electronic messages from the computing device 140, and the parser 180 knows the recording format of the received electronic messages. Similarly to the working process of the parser 160 or the parser 170 described above, the parser 180 processes each receives e-mails and extracts from their texts necessary references to web resources (these references have their own specific recording format) and at least some of the identification data, describing these extracted references, allowing for transmission, via the Internet network 110, of the extracted references, set in accordance with the extracted identification data, into the computing device 200 for their subsequent analysis, features of which will be described below. It shall be noted that the parser 180 uses a corresponding regular expression from a set of regular expressions, to which the parser 180 has access, to extract the necessary references to web resources from the text of the processed electronic messages. The parser 180 may be implemented as a separate server or other known computing device.

In some non-limiting embodiments of the present technology, the computing device 140 may be configured to transmit messages to the parser 180 using the Internet network 110, and the parser 180 may be connected directly to the computing device 200 via a wire-based communication link (not depicted).

The mobile device 150, which may be, according to the non-limiting embodiments of the present technology, a smartphone, a cell phone, a tablet, etc., is configured to communicate with the computing device 200 using two communication channels. In particular, for data exchange between the mobile device 150 and the computing device 200 through one of these communication channels, the mobile device 150 is wire-based connected to a parser 190 with the possibility of sending electronic messages to it, comprising, inter alia, references to potentially malicious web resources, at the e-mail address associated with the parser 190, wherein the transmitted e-mails have a predetermined description format similar to the above output data streams of the API-interfaces 124, 134. The parser 190 is pre-programmed or configured to work with the mobile device 150, so that the parser 190 receives electronic messages from the mobile device 150, wherein the parser 190 knows a recording format of the received electronic messages. Similarly to the working process of the parser 160 or parser 170 described above, the parser 190 extracts references to web resources from each received e-mail (these references have their own specific recording format) and at least some of the identification data describing these extracted references, with the provision of transmission, via the Internet network 110 of the extracted references to web resources, set in accordance with some of the extracted identification data, to the computing device 200 for their subsequent analysis, the characteristics of which will be described below. It shall be noted that the parser 190 may be implemented as a separate server or any other known computing device.

In addition, for data exchange between the mobile device 150 and the computing device 200 via another communication channel, the mobile device 150 is connected, via a cellular network 115, to a parser 195 configured to transfer, for example, SMS messages and/or MMS messages comprising, inter alia, references to web resources, by the contact number associated with the parser 195, wherein the transmitted SMS messages and/or MMS messages have the specified description format, similar to the above described output data streams of the API-interfaces 124, 134. The parser 195 is pre-programmed or configured to work with mobile device 150, due to which this parser 195 receive SMS messages and/or MMS messages from mobile device 150, wherein the parser 195 knows the recording format of the received SMS messages and/or MMS messages. To receive SMS and MMS messages sent from the mobile device 150 to the parser 195, via the cellular network 115, the parser 195 is connected to an external modem equipped with a SIM card.

Similarly to the working process of the parser 160 or parser 170 described above, the parser 195 extracts references to web resources from each received SMS or MMS message (and these references have their own specific recording format) and at least some of the identification data, describing these extracted references, such as the sender's contact number, with the transfer of these extracted references, set in accordance with some extracted identification data, into the computing device 200 wire-based connected to the parser 195, for their subsequent analysis, the features of which will be described below. It shall be noted that the parser 195 uses a corresponding regular expression from a set of regular expressions, to which the parser 195 is configured to access, to extract the necessary references to web resources from the text of the received electronic messages. The parser 195 may be implemented as a separate server or any other known computing device.

In some non-limiting embodiments of the present technology, the converting module connected to the parser 180 (not depicted) and the converting module connected to the parser 190 (not depicted) can be implemented as a single converting module wire-based or wirelessly connectable, configured to exchange data with the computing device 140 and the mobile device 150, and having functions similar to the functions of these connected converting modules.

In some non-limiting embodiments of the present technology, the computing device 200 may be configured to connect directly to each of the computing device 140 and the mobile device 150 with provision of direct access to their internal databases located in the memory of these devices, to receive messages from them, e.g. SMS, MMS, email, etc. (wherein on each of the computing device 140 and the mobile device 150, for example, a special client program shall be installed). The computing device 200 can process each received message to extract references therefrom for further processing.

In other embodiments of the present technology, each of the parsers 180, 190, 195 may be connected with a possibility of data exchange with computing device 200 using the Internet network 110.

In yet other embodiments of the present technology, each of the parsers 180, 190, 195 can be wire-based communicating with the computing device 200.

In some non-limiting embodiments of the present technology, each of the computing device 140 and the mobile device 150 can be configured to exchange data with the parsers 180, 190 using the Internet network 110, and the parsers 180, 190 can be wire-based connected to the computing device 200.

In other non-limiting embodiments of the present technology, the parser 195 may be connected to a computing device 200 via the Internet network 110.

It shall be noted that the reference source 120, the reference source 130, the computing device 140, and the mobile device 150 are depicted in FIG. 1 solely as an example, that is, it shall not be considered that a possible embodiment of the system 300 for informing about malicious web resources is limited to the example depicted on FIG. 1, it shall be clear to those skilled in the art that system 300 may comprise two or more reference sources, each being similar to the above reference source 120 or the reference source 130, two or more computing devices, each being similar to the above described computing device 140, and/or two or more mobile devices, each being similar to the above described mobile device 150.

In some non-limiting embodiments of the present technology, each of the reference sources, each being similar to the above-described reference source 120, can be connected to the computing device 200 by means of a separate parser with functionality similar to the above-described parser 160, and each such separate parser will be pre-programmed or configured to work with a respective reference source to understand the syntax of the API-interface commands of that respective reference source.

In other non-limiting embodiments of the present technology, all reference sources in system 300, each being similar to the above described reference source 120, can be connected to computing device 200 by means of a single parser with functionality similar to the above described parser 160, and such a common parser shall be preprogrammed or configured to work with each of these connected reference sources to understand the syntax of the commands of its API-interface.

In some non-limiting embodiments of the present technology, each of the reference sources, each being similar to the above-described reference source 130, may be connected to the computing device 200 via a separate parser with functionality similar to the above-described parser 170, wherein each such individual parser will be pre-programmed or configured to work with a respective reference source to understand the syntax of the API-interface commands of that respective reference source.

In other non-limiting embodiments of the present technology, all reference sources in system 300, each being similar to the above described reference source 130, may be connected to the computing device 200 via a single parser with functionality similar to the above described parser 170, and such a common parser shall be preprogrammed or configured to work with each of these connected sources of links to understand the syntax of the commands of its API-interface.

In yet other non-limiting embodiments of the present technology, each of computing devices, each being similar to the above described computing device 140 may be connected to the computing device 200 via a separate parser with functionality similar to the above described parser 180, wherein each such separate parser will be pre-programmed or configured to work with a respective one of the computing devices to understand the format of recording electronic messages received from therefrom.

In yet further other non-limiting embodiments of the present technology, all computing devices in system 300, each being similar to the above-described computing device 140, may be connected to the computing device 200 via a single parser with functionality similar to the above-described parser 170, and such a common parser shall be preprogrammed or configured to work with each of these connected computing devices to understand the format for recording electronic messages received therefrom.

In some non-limiting embodiments of the present technology, each of mobile devices, each being similar to the above described mobile device 150, can be connected to the computing device 200 via a separate parser with functionality similar to the above described parsers 190, 195, wherein each such parser will be pre-programmed or configured to work with a respective one of the mobile devices to understand the format of recording messages received therefrom, in particular, electronic messages, SMS-messages and/or MMS-messages.

In other non-limiting embodiments of the present technology, all mobile devices in system 300, each being similar to the mobile device 150 described above, can be connected to the computing device 200 by means of a single parser with functionality similar to the parsers 190, 195, wherein such a common parser is programmed or configured to work with each of these connected mobile devices to understand the format for recording messages received therefrom, in particular e-mails, SMS-messages and/or MMS-messages.

In some non-limiting embodiments of the present technology, at least part of reference sources, each being similar to one of the reference source 120 and the reference source 130, computing devices, each being similar to the computing device 140, and mobile devices, each being similar to the mobile device 150 can be connected to the computing device 200 by means of one parser with functionalities similar to one of the above described parsers 160, 170, 180, 190 and 195, wherein such a common parser shall be properly preprogrammed or configured to work with each of the connected reference sources to understand the syntax of the commands of its API-interface, each of the connected computing devices to understand the recording format of electronic messages received from a respective one of the computing devices, and each of the connected mobile devices to understand the message recording format of the types described above, received from a respective one of the mobile devices.

According to other non-limiting embodiments of the present technology, a computing device may be subscribed to an RSS casting under at least one of the reference sources, each being similar to the above described reference source 120, and/or an RSS casting of at least one of the reference sources, each being similar to the reference source 130, to receive at least one report from specified reference sources, indicating, for example, the appearance of at least one new reference to a web resource in the corresponding reference source.

According to yet other non-limiting embodiments of the present technology, the system 300 may additionally comprise a separate reference base that is external or remote with respect to the computing device 200, wherein each of the parsers 160, 170, 180, 190 and 195 can be executed with the possibility to have access to this external reference bases configured to record references therein that have been extracted properly, in accordance with the above description. As a result, this external reference base comprises references to potentially malicious web resources, each being put in accordance with the auxiliary identification data describing the reference, such as the date and time of recording and/or at least one other identifier. The computing device 200 is configured to have access to such a reference base with the possibility of extracting therefrom necessary references for their subsequent processing, the features of which are described below. As an addition or alternative to these embodiments, the above external base of references may also comprise many references to known malicious web resources.

According to yet further non-limiting embodiments of the present technology, the system 300 may comprise only the computing device 200 and a structured reference base that is external or remote with respect to the computing device 200. In these embodiments, the external reference base comprises references to potentially malicious web resources recorded from many different sources, with each reference in this external reference base being associated with auxiliary identification data describing it. For example, the auxiliary identification data may include a date and time of recording and/or at least one other identifier. The computing device 200 is configured to have access to such an external reference base with the possibility of extracting necessary references therefrom for subsequent processing, the features of which are described below. As an addition or alternative to these embodiments, the above external reference base may also comprise many references to known malicious web resources.

Computing Device for Informing about Malicious Web Resources

The computing device 200 depicted on FIG. 2, according to the non-limiting embodiments of the present technology, is configured to inform authorized entities about the identified malicious web resources and is essentially a combination of hardware and software implemented as a general-purpose computer, having the structure described below, which is well known to those skilled in the art.

It shall be noted that throughout the present application, an authorized entity refers to an individual who can block the operation of a web resource or influence the decision to block a malicious web resource or suspend its operation, for example, the administrator of a web resource, the owner of a web resource, etc., or a legal entity that can block the operation of a web resource or influence the decision to block or suspend a malicious web resource, such as a domain name registrar, a hosting provider etc.

In particular, a general-purpose computer usually comprises a central processor, system memory, and a system bus, which in turn comprises various system components, including memory associated with the central processor. A system bus in such a general-purpose computer comprises a memory bus and a memory bus controller, a peripheral bus and a local bus, configured with a possibility of interaction with any other bus architecture. System memory comprises read-only memory (ROM) and random access memory (RAM). The Basic Input/Output System (BIOS) comprises the basic procedures that ensure the transfer of information between the elements of such a general-purpose computer, for example, when the operating system boots using the ROM. In addition, a general purpose computer comprises a hard disk for reading and recording data, a magnetic disk drive for reading and recording to removable magnetic disks, and an optical drive for reading and recording on removable optical disks such as CD-ROM, DVD-ROM and other optical storage media, but other types of computer storage media can be used to store data in machine-readable form, such as solid-state drives, flash cards, digital disks, etc., and connected to the system bus via controller. At a general-purpose computer, a hard disk, a magnetic disk drive and an optical drive are connected to the system bus via a hard disk interface, a magnetic disk interface and an optical drive interface, respectively. Drives and associated computer storage media are non-volatile means of storing computer instructions, data structures, program modules and other general-purpose computer data. A general purpose computer has a file system that stores a recorded operating system, as well as additional software applications, other software modules and program data. The user can enter commands and information into a general-purpose computer using known input devices, such as a keyboard, mouse, microphone, joystick, game console, scanner, etc., wherein these input devices are usually connected to a general-purpose computer via a serial port, which is in turn connected to the system bus, but they can also be connected in some other way, for example, using a parallel port, a game port, or a universal serial USB bus. A monitor or other type of display device is also connected to the system bus via an interface, such as a video adapter. In addition to the monitor, a personal computer can be equipped with other peripheral output devices, such as speakers, a printer, etc. A general purpose computer can work in a network environment, and a network connection can be used to connect to one or more remote computers. Network connections can form a local area network (LAN) and wide area network (WAN). Such networks are usually used in corporate computer networks and internal networks of companies, wherein they have access to the Internet. In a LAN or WAN network, a general purpose computer is connected to the local network via a network adapter or network interface. When using networks, a general purpose computer may use a modem, network card, adapter or other means of providing connection with a global computer network, such as the Internet, and these means of communication are connected to the system bus via a serial port. It shall be noted that in the ROM of the general purpose computer or at least in any of the above computer-readable media that can be used in a general-purpose computer, the computer-readable instructions can be stored which can be accessed by the CPU of the general-purpose computer, wherein execution of these machine-readable instructions on a general-purpose computer may cause the central processor to execute various procedures or operations described later in this document.

In some non-limiting embodiments of the present technology, the computing device 200 may be implemented as a single computer server, such as a Dell™ PowerEdge™ server using the Ubuntu Server 18.04 operating system. Besides, in other non-limiting embodiments of the present technology, the computing device 200 may be a desktop personal computer, a laptop, a netbook, a smartphone, a tablet, and any other electronic computing device suitable for solving the set tasks.

In yet other non-limiting embodiments of the present technology, the computing device 200 may be any other combination of hardware, software or software and hardware complex, suitable for solving tasks.

In some non-limiting embodiments of the present technology, the system 300 may comprise at least two computing devices, each being similar to the computing device 200, and the functionality described below of the computing device 200 may be divided in any appropriate way between the at least two computing devices, wherein each of them for example, can be manufactured as a separate computer server. The computing device 200 depicted on FIG. 2 comprises a communication module 10, an analyzing module 100 and a local data storage 20, each being connected to a communication bus 30, wherein each communication module 10 and the analyzing module 100 are able to exchange data via the communication bus 30 with the local storage 20 data, and the communication module 10 is also configured to exchange data with the analyzing module 100.

In the non-limiting embodiments of the present technology, each of the above-described parsers 160, 170, 180, 190 and 195 can be implemented as a separate data preprocessing module embedded in the computing device 200 (i.e., included in this computing device 200) and having the above-described functionality of one of the corresponding parsers 160, 170, 180, 190 and 195, in particular, the functionality for providing interaction or data exchange between the computing device 200 and one of the corresponding reference source 120, the reference source 130, the computing device 140 and the mobile device 150 (i.e., each of these separate data preprocessing modules shall be pre-programmed to work with one of the corresponding reference source 120, reference source 130, computing device 140 and mobile device 150) and on processing input data streams from one of the corresponding reference source 120, the reference source 130, the computing device 140 and the mobile device 150.

In some non-limiting embodiments of the present technology, the communication module 10 of the computing device 200 may be made multi-channel, for example, four-channel, with each of the communication channels the communication module 10 being pre-configured to exchange data, via the communication bus 30, with one of the above described modules for data processing and data exchange with one of the corresponding reference source 120, the reference source 130, the computing device 140 and the mobile device 150.

In other non-limiting embodiments of the present technology, the computing device 200 may be equipped with four communication modules, each being similar to the communication module 10, each of these communication modules being pre-configured to exchange data via the communication bus 30 with one of the above described separate data processing modules and data exchange with one of the corresponding reference source 120, the reference source 130, the computing device 140 and the mobile device 150. In these embodiments, each of the separate data-processing modules (not depicted) are also configured to interact, via the communication bus 30, with the analyzing module 100 to process requests for receiving references that can be generated by this analyzing module 100, and then sending them from the computing device 200 to one of the corresponding above-described reference source 120, the reference source 130, the computing device 140 and the mobile device 150. It shall also be noted that when processing the input data streams received from one of the corresponding reference source 120, the reference source 130, the computing device 140 and the mobile device 150, each of these separate preprocessing modules (not depicted) can, inter alia, identify or recognize the format of the description of the received input data stream. If the identified data description format does not conform to a unified data description format appropriate for the computing device 200, then each of the separate data preprocessing modules can be further configured to convert this received input data stream into the specified unified format, wherein it can be further implemented with the possibility of communication, via the communication bus 30, with the local data storage 20, ensuring that data about the unified data description format (as described below), understood by the computing device 200, are obtained, and with the possibility of comparing the identified and unified data formats indicated to decide whether they are appropriate or inconsistent with each other. Thus, if any of the above described separate data preprocessing modules reveals that among the input data streams received from one of the corresponding reference source 120, the reference source 130, the computing device 140 and the mobile device 150, there are, for example, voice messages or video messages, then such a separate data preprocessing module converts such messages into text, that is, into such data description format which is understandable to the computing device 200, followed by extracting from it of the references to potentially malicious web resources.

In yet other non-limiting embodiments of the present technology, the above-described parsers 150, 160, 170, 180, 190 and 195 can be implemented as a single data preprocessing module (not depicted) embedded in the computing device 200 (i.e., included in this computing device 200) and having the above-described functionality of all the parsers 150, 160, 170, 180, 190 and 195; in particular, the functionality to provide interaction or data exchange between the computing device 200 and each of the reference source 120, the reference source 130, the computing device 140 and the mobile device 150 (i.e., such a single preprocessing module shall be pre-programmed to work with each of the reference source 120, the reference source 130, computing device 140 and mobile device 150) and processing input data streams from each of the reference source 120, the reference source 130, the computing device 140 and the mobile device 150. In these embodiments, a single data processing module (not depicted) shall also be connected to the computing device 200, via the communication bus 30, with the possibility of data exchange with the communication module 10 providing interaction between the computing device 200 and the reference source 120, the reference source 130, the computing device 140 and the mobile device 150, wherein the communication module 10 of the computing device 200 can then be performed, for example, as multichannel, and each of the communication channels in the communication module 10 can be pre-configured to communicate with one of the corresponding reference source 120, reference source 130, the computing device 140 and the mobile device 150. In these embodiments, a single data preprocessing module (not depicted) is also configured to interact, via the communication bus 30, with the analyzing module 100 to process requests for receiving references which can be generated by this analyzing module 100, with their subsequent forwarding from the computing device 200 to the above-described reference source 120, the reference source 130, the computing device 140, and the mobile device 150. It shall also be noted that when processing input data streams received from the reference source 120, the reference source 130, the computing device 140 and the mobile device 150, a single preprocessing module (not depicted) can, inter alia, identify or recognize the format for describing this input data streams, and if the identified data description format does not conform to a unified data description format suitable for the computing device 200, then it can additionally be configured to convert these received input data streams into the specified unified format, wherein this single preprocessing module can be additionally configured to communicate, via the communication bus 30, with the local data storage 20, ensuring receipt of data about the unified data description format (as described below), understandable to computing device 200, and configured to compare specified identified and unified data formats for decision-making on their compliance or non-compliance with each other. Thus, if the above described single data preprocessing module reveals that among the input data streams it received from the reference source 120, the reference source 130, the computing device 140 and the mobile device 150, there are, for example, voice messages or video messages, then such single data preprocessing module converts such messages into text, that is, into such data description format that is understandable to computing device 200, with the subsequent extraction of references to potentially malicious web resources from it.

In some non-limiting embodiments of present technology, the functionality of the above-described parsers 160, 170, 180, 190, 195 can be implemented as additional functionality of the analyzing module 100; in particular, each of the parsers 160, 170, 180, 190, 195 or all of these parsers can be implemented as a separate software module embedded in the computing device 200 and executed by the analyzing module 100.

In some non-limiting embodiments of the present technology, the computing device 200 may further comprise an auxiliary contextual advertising collection module (not depicted), configured to automatically collect contextual advertising depicted or demonstrated to users in known search engines, such as, for example, Bing™ search engine, Google™ search engine, Yandex™ search engine etc., the auxiliary contextual advertising collection module allowing for extraction, from contextual advertising, collected at least in one of these search engines, of at least one reference to a web resource. The auxiliary contextual advertising collection module is connected to the communication bus 30 and is configured to exchange data via the communication bus 30 with the communication module 10, the local data storage 20 and the analyzing module 100. It shall be noted that recently abusers often resort to distributing references to malicious web resources by placing these links in contextual advertising of the search engines, and this malicious advertisement is usually targeted to the most frequent search queries of users in each of these search engines, since such lists of the most popular keywords by users are freely available on the sites of these search engines. In this embodiment of this technique, the local data storage 20 further has a separate database of search query keywords comprising several sections, each with the stored keywords of the most frequent search queries of the corresponding one of the well known search engines, to the work with which the module for collection of contextual advertising is pre-configured or programmed, so that all keywords in each specific section of this base are aligned with one of the well known search systems. The module for collecting contextual advertising is also configured to at least periodically update (for example, daily) the database of search query keywords placed in the local data storage 20 for at least one of the search engines known to it, for example, by periodically automatically obtaining an up-to-date list of key words that are most popular with users in a particular search engine, using a specific link to the web page of the site of this search engine stored in the local data storage 20 and retrieved from there by the specified module of collection of contextual advertising when updating a specific section of the database of search queries corresponding to the specified search engine, followed by updating the existing list of keywords of search queries in the base section of the keyword of search queries corresponding to the specified search system, based on the obtained current list of keywords. The auxiliary contextual advertising collection module is also configured to form at least one search query for at least one of the search engines known to it using at least a part of the keywords comprised in one of the sections of the search query keyword database corresponding to this search engine, and configured to automatically transfer this generated search query to this search engine. The auxiliary contextual advertising collection module is also configured to retrieve search results issued by a search engine in response to a transmitted request, and configured to filter the search results to detect contextual advertising in the form of advertisements among them, based on, for example, the "advertising" tag, which is provided for such advertisements, wherein each such advertisement has, among other things, at least one reference to the web resources. The auxiliary contextual advertising collection module is additionally configured to retrieve, for example, a regular expression known to it, such as, for example, (https?|ftp)://(−\.)?([^\s/?.#−]+\.?)+(/[^\s]*)?$@iS, at least one reference to web resources from each detected advertisement with provision of transmission by communication bus 30 of each of these references to a web resource to the analyzing module 100 for its subsequent analysis for maliciousness to identify or to determine whether a web resource located in this reference pertains to the malicious web resources, as described in more details hereinafter. Thus, the auxiliary contextual advertising collection module, for example, can sequentially generate search queries for each particular search engine using some combination of keywords formed from at least part of the keywords in the existing keyword list corresponding to that search engine until the end of this keyword list is reached. It shall be noted that the above described method of obtaining references to web resources by the computing device 200 may be an alternative or addition to the above methods of obtaining references to web resources used in the system 300. In the described embodiments, the auxiliary contextual advertising collection module can be implemented, for example, as a separate processor embedded in the computing device 200.

In some non-limiting embodiments of the present technology, the functionality of the auxiliary contextual advertising collection module described above can be implemented as additional functionality of the analyzing module 100, in particular, the auxiliary contextual advertising collection module can be implemented as a separate software module included in the computing device 200 and executed, for example, by analyzing module 100. In other non-limiting embodiments of the present technology, the auxiliary contextual advertising collection module may be one of the functional submodules of the analyzing module 100.

In yet other non-limiting embodiments of the present technology, the auxiliary contextual advertising collection module described above may be a separate reference source, for example, a separate server that is external to the computing device 200 and is wire-based connected thereto and/or wirelessly, ensuring that it can send references to the web resources, wherein the references to the web resources transmitted from such an external source of references can be received by the communication module 10 of the computing device 200.

Local Data Storage

In accordance with the non-limiting embodiments of the present technology, the local data storage 20 is also configured to store executable software instructions that allow to control the operation of functional modules embedded in the computing device 200; in particular, the communication module 10 and the analyzing module 100, and allow these functional modules to implement their functionality when executing these software instructions. Executable software instructions stored in the local data store 20 also allow to control the operation of any submodules, which in some non-limiting embodiments of the present technology, are included in some of the functional modules, for example, in the analyzing module 100, and allow these submodules to implement their functionality when executing these software instructions.

The local data storage 20 can also store executable software instructions that allow to control the operation of any additional functional modules embedded in the computing device 200 and their submodules, and which allow these additional functional modules and their submodules to implement their functionality when executing these software instructions.

In the non-limiting embodiments of the present technology, the local data storage 20 is further configured for storing various data used in the operation of the computing device 200, in particular, data on a unified data description format understandable to the computing device 200, data on known malicious references, data on known malicious domain names, data on hash sum of known malicious files, data on keywords indicating the malicious nature of a web resource, data on hosting provider, data on domain name registrar, a list of known authorized entities, a set of known types of malicious threats to web resources, a set of report templates, etc. The local data storage 20 may also store other data used in the operation of the various functional modules embedded in the computing device 200 and the operation of at least some of the submodules included in some of these functional modules.

In the non-limiting embodiments of the present technology, auxiliary data used in the work of the analyzing module 100 can also be stored in the local data storage 20, for example, data on language dictionaries and a predetermined threshold value used in the method of analyzing domain names based on the correctness of their spelling; virtual machine image files and a set of rules for analyzing changes in virtual machine state parameters used in suspicious file analysis methods based on changes in virtual machine state parameters, a set of regular expressions used to extract references to web resources from input data streams analyzed in the analyzing module 100, and other auxiliary data.

Figure 2:
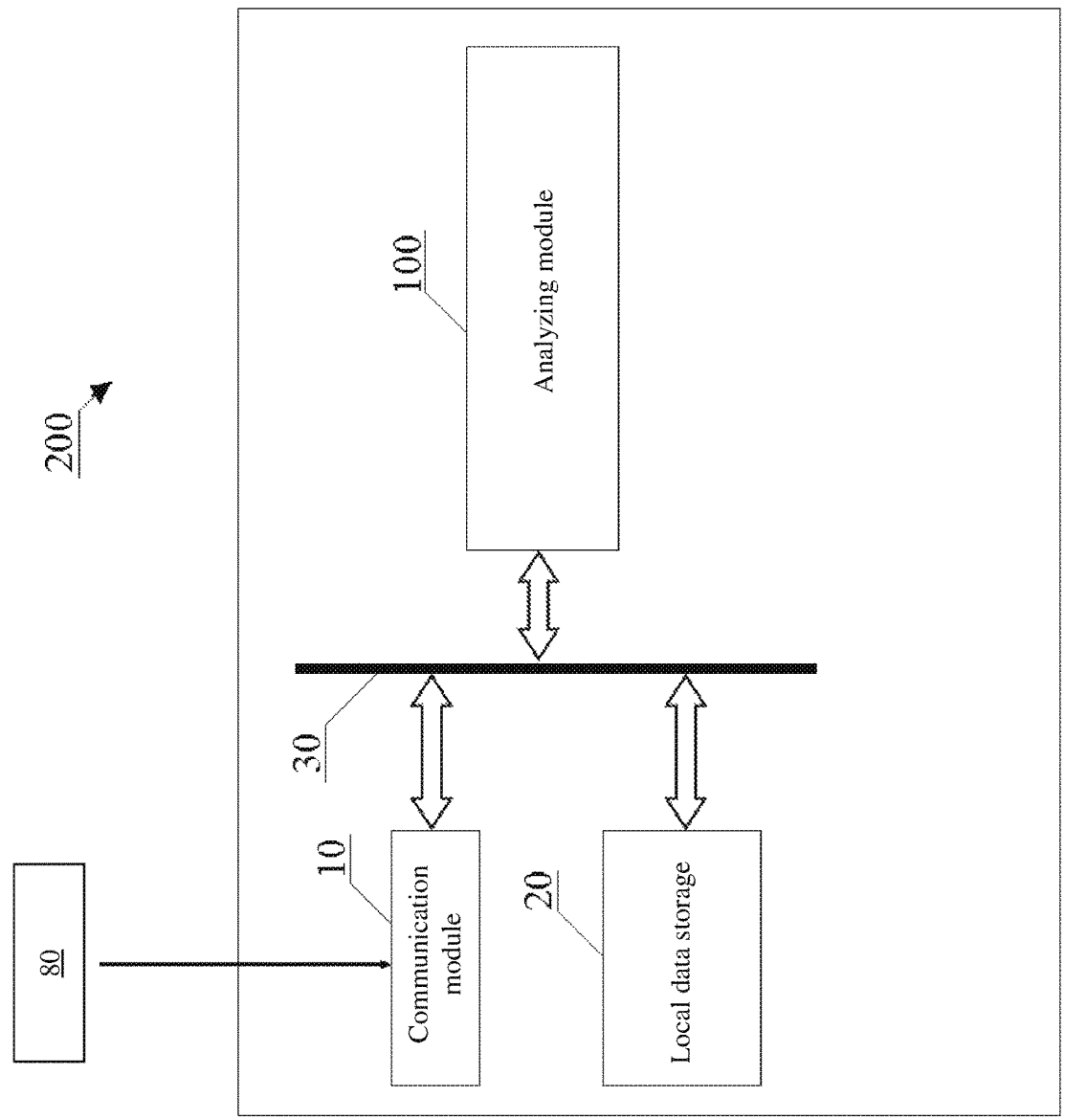
FIG. 2 depicts a functional diagram of a computing device of the system of FIG. 1 for informing about malicious web resources, according to the non-limiting embodiments of the present technology.

In the computing device 200 depicted in FIG. 2, the communication module 10 is configured to receive the extracted references to web resources transmitted by the parsers 160, 170, 180, 190 and 195 to the computing device 200, and then to save the received references to the web resources in the local data storage 20 by virtue of using the communication bus 30. Thus, the local data storage 20 can store the references to web resources extracted from data streams from the references source 120, references to web resources extracted from data streams from the references source 130, references to web resources extracted from messages from the computing device 140, and/or references to web resources extracted from messages from the mobile device 150, and at least some of the extracted identification data describing such stored references.

In some non-limiting embodiments of the present technology, the local data storage 20 in the computing device 200 may comprise one or more databases, each configured to store at least one separate group of the above groups of data used in the operation of the computing device 200, and/or at least some of the accepted references to web resources.

In other non-limiting embodiments of the present technology, at least one separate remote data storage (not depicted) can be used, to which the analyzing module 100 of the computing device 200 can be configured to have access, using the communication module 10, to store therein at least some of the above described groups data and/or at least part of the accepted references to web resources.

In some non-limiting embodiments of the present technology, the computing device 200 may comprise at least one local data storage and at least one remote data storage (not depicted), each being configured to store at least one of the data groups described above and/or at least parts of the received references to the web resources; in addition, each of the local data storages can be connected to the analyzing module 100 via the communication bus 30, and the indicated remote data storages are each connected with analyzing module 100 via communication module 10. Thus, for example, according to these embodiments, the computing device 200 comprises a single local data storage 20 that stores, for example, only received references to web resources, and comprises several remote data storages, each storing at least some of the above groups of data used in the operation of the computing device 200.

In some non-limiting embodiments of the present technology, at least one of the above groups of data and/or received references to web resources can be stored in the corresponding separate local data store (not depicted), different from the local data storage 20 and connected via connection bus 30, with the analyzing module 100, which in turn is configured to connect to any of these separate local data storages allowing for extracting therefrom the necessary references to web resources.

The analyzing module 100 may be implemented as a single processor, such as a general-purpose processor or a special-purpose processor (for example, processors for digital signal processing, specialized integrated circuits, etc.), and configured to execute software instructions stored in the local data storage 20, with the implementation of the following functionality of the analyzing module 100.

The local data storage 20 may be implemented, for example, in the form of one or more known physical computer-readable media for long-term data storage. In some non-limiting embodiments of the present technology, the local data storage 20 may be implemented using a single physical device (for example, a single optical storage device, a magnetic storage device, an organic storage device, a storage device on disks, or a different type of storage device); and in other non-limiting embodiments of the present technology, the local data storage 20 may be implemented using two or more known storage devices.

Communication Module

The communication module 10 used in the computing device 200 depicted on FIGS. 1 and 2, has a wireless connection with the above-described parsers 160, 180, 190 configured to exchange data therewith, and also has a wired connection with the above-described parsers 170, 195 configured to exchange data with them.

In some non-limiting embodiments of the present technology, the communication module 10 may be wire-based connected to all the parsers 160, 170, 180, 190, 195 to exchange data therewith, for example, using a coaxial cable, twisted pair, fiber optic cable or other physical connection. In these embodiments, the communication module 10 may be implemented, for example, as a network adapter equipped with necessary connectors for connecting the necessary types of physical cables to them depending on types of physical connections used to provide communication with the parsers 160, 170, 180, 190, 195.

In other non-limiting embodiments of the present technology, the communication module 10 can be connected to all parsers 160, 170, 180, 190, 195 using a wireless connection to exchange data therewith, for example, using a communication link based on "WiFi" technology, a communication link based on 3G technology, LTE-based communication links and/or the like. In these embodiments, the communication module 10 may be implemented, for example, as a WiFi network adapter, a 3G adapter, an LTE adapter, or another wireless communication adapter, depending on type of wireless communication link used to provide connection with the parsers 160, 170, 180, 190, 195.

In yet other non-limiting embodiments of the present technology, the communication module 10 may use any suitable combination of wire-based and wireless communication links to exchange data with at least some of the parsers 160, 170, 180, 190, 195 included in the system 300.

The communication module 10 may also be a known communication device, such as a transmitter, receiver, transceiver, modem, and/or a network interface card for exchanging data with external devices of any type via a wire-based or wireless communication network, for example, using an Ethernet network connection, digital subscriber line (DSL), a telephone line, a coaxial cable, a cellular telephone system, etc.

In some non-limiting embodiments of the present technology, the computing device 200 may additionally be equipped with a SIM card modem for receiving SMS messages and/or MMS messages from mobile devices, such as the mobile device 150.

Analyzing Module

The analyzing module 100 included in the computing device 200 depicted on FIG. 2, according to the non-limiting embodiments of the present technology, may be implemented as a single processor, such as a general-purpose processor or a special-purpose processor (for example, processors for digital signal processing, specialized integrated circuits, etc.), for example, as a central processor of the above-described general-purpose computer, in the form of which the computing device 200 may be implemented.

The analyzing module 100 is configured to access the local data storage 20 (separate local data storage or remote data storage, depending on particular embodiments, as described above in this document) or to communicate with it using the communication bus 30 to ensure extraction from it of the references to web resources for their subsequent analysis, as it will be described below.

In some non-limiting embodiments of the present technology, the analyzing module 100 may be configured to communicate, via the communication bus 30, with the communication module 10, ensuring that it can receive references to web resources for their subsequent analysis, as it will be described in more details below. Thus, in these embodiments, the analyzing module 100 may receive references to web resources directly from the communication module 10 immediately after receiving these references by the communication module 10.

In the non-limiting embodiments of the present technology where the obtained references to web resources are stored in a separate local storage other than the local data storage 20, or in a remote data storage, the analyzing module 100 may be configured to access such a separate or remote data storage or configured to communicate with it using the communication bus 30, ensuring that stored web resource references are extracted therefrom for subsequent analysis, as will be described in more details below.

In the non-limiting embodiments of the present technology, the analyzing module 100 is configured to analyze each of the obtained or extracted references to web resources in order to identify web resources with malicious and/or illegal content, also called malicious web resources, among web resources that are located under the analyzed references as will be described in more details below.

In particular, to detect malicious web resources, when analyzing references to web resources, the analyzing module 100 (*i*) has access to the local data storage 20 (a separate local data storage or a remote data storage, depending on the embodiment, as described earlier in this document) or establishes communication with it using the communication bus 30, ensuring that data about known malicious references is obtained therefrom; and (ii) establishes, by character-by-character comparison of each analyzed references with known malicious references from the indicated obtained data, the fact of at least partial correspondence of the analyzed reference with at least one of the known malicious references.

Thus, if the analyzing module 100 has established or discovered that a specific reference has at least partially correspond to at least one of the known malicious references, then this indicates that that specific reference is associated with malicious references and, accordingly, the web resource located under that specific reference refers to malicious web resources.

If, however, the analyzing module 100 has established or discovered that the analyzed reference does not at least partially correspond with any of the known malicious references, then it additionally performs at least one of the following operations, wherein it: 1) analyzes the domain name of the analyzed reference for maliciousness using at least one method of analyzing domain names; 2) obtains or downloads at least one file located under the analyzed references, followed by its analysis for maliciousness using at least one method for analyzing files; and 3) obtains the html-code of the web resource located under the analyzed reference, followed by its analysis for maliciousness using at least one method for analyzing html-code.

In the non-limiting embodiments of the present technology, when analyzing a domain name of any analyzed reference for maliciousness, the analyzing module 100 (*i*) is configured to have access to the local data storage 20 (separate local data storage or remote data storage, depending on the embodiment, as described earlier in this document) or communicates with it using the communication bus 30 to ensure that data about known malicious domain names is obtained from it, (ii) establishes or detects, by character-by-character comparison of each analyzed domain name with known malicious domain names from the obtained data, the fact that this analyzed domain name at least partially corresponds to one of the known malicious domain names. If the analyzing module 100 found or discovered that the analyzed domain name does not at least partially correspond to any of the known malicious domain names, then it can additionally apply to such an analyzed domain name at least one of the methods of domain name analysis for suspiciousness, for example, a domain name analysis method based on its length (the longer a domain name is, the more suspicious it is), a domain name analysis method based on its entropy (wherein, the higher information entropy calculated for a particular domain name of the Shannon formula, the more suspicious the domain name is), a method for analyzing a domain name based on its meaningfulness and/or a method of analyzing the domain names based on the correctness of their spelling. As an example, when the analyzing module 100 analyzes a domain name for maliciousness using a domain name analysis method based on correctness of its spelling, it performs at least the following operations: (i) communicates with the local data storage 20 (by a separate local or remote data storage depending on the embodiment, as described earlier in this document) to retrieve language dictionary data therefrom, (ii) extracts at least one word from each of the obtained domain names, (iii) determines the Levenshtein distance between each of the specified extracted words and one of the corresponding words in the language dictionaries of the specified obtained data, and (iv) compares the determined Levenshtein distance with a specified threshold value, for which a constant equal to two (2) may be used, concluding, for example, that the analyzed domain name is classified as the malicious domain names if the determined Levenshtein distance exceeds the specified threshold value equal to two (2).

Thus, in the non-limiting embodiments of the present technology, if the analyzing module 100 has established or discovered, through at least one of the above described analysis methods, that the domain name of a particular analyzed reference belongs to malicious domain names, this indicates that that reference refers to malicious references and, accordingly, a web resource located under that reference is a malicious web resource.

In the non-limiting embodiments of the present technology, when analyzing a file located under the analyzed reference for maliciousness, the analyzing module 100 performs at least the following operations: (i) obtaining the file located under the analyzed reference; (ii) calculating a hash sum of the obtained file; (iii) obtaining access to the local data storage 20 (separate local data storage or remote data storage, depending on the embodiment, as described earlier in this document) or establishing communication with it using the communication bus 30 to receive data indicative of hash sums of files known to be malicious; (iv) determining if the analyzed files is malicious by comparing the calculated hash-sum of the analyzed file with the hash sums of files known to be malicious files from the received data.

Thus, if the analyzing module 100 has determined or discovered that the hash sum of a particular file corresponds to one of the hash sums of files known to be malicious, then that particular file is considered malicious, which indicates that this reference belongs to malicious references and, accordingly, the web resource located under that reference belongs to malicious web resources.

If the analyzing module 100 has determined or discovered that the hash sum of the analyzed file does not correspond to any of the hash sums of files known to be malicious, then it can additionally apply to that analyzed file at least one of the methods of file analysis for suspiciousness, for example, a method of file analysis for suspiciousness based on a change in the state parameters of virtual machines, wherein the analyzing module 100 performs at least the following operations: (i) launching every file received on at least one virtual machine characterized by a given set of state parameters, (ii) recording changes in a given set of state parameters of at least one specified virtual machine for a given period of time, (iii) analyzing the obtained state change parameters using a specified set of analysis rules to ensure that the specified launched file is classified as malicious files, if the analyzed changes in the state parameters are typical for malicious files.

Thus, if the analyzing module 100 has determined or discovered, using at least one of the above-described analysis methods, that the file located under a specific reference belongs to malicious files, this indicates that this reference belongs to malicious references and, accordingly, a web resource located under this reference belongs to malicious web resources.

In the non-limiting embodiments of the present technology, when analyzing the html-code of a web resource located under the analyzed reference for maliciousness, the analyzing module 100 performs at least following operations: (i) loading the html-code of the web resource located under this reference; (ii) analyzing downloaded html-code for maliciousness using at least one of html-code analysis methods, for example, methods for analyzing html-code based on keywords indicating the malicious nature of a web resource. In addition, when analyzing downloaded html-code for maliciousness, the analyzing module 100 can also download all images and/or other files associated with the web resource, for example, graphic design elements (* .JPG, * .PNG, etc.), style sheets (* .css), JS scripts, etc., based on lists of such images and/or other files obtained by the analyzing module 100 from the extracted html-code, allowing for verification of the so-called screen-signatures, i.e. search for similar images and analysis of related web resources, wherein the search for similar images may be performed, e.g., using techniques of similar image search on the basis of a method of search for the nearest neighbors. During this search, the analyzing module 100 determines whether, for example, the images placed on the analyzed web resource correspond to the domain name and registration data of the web resource, wherein the analyzing module 100 can also additionally calculate the hash sums of all the images present on the analyzed web resource, and determine whether each calculated image hash sum matches one of the hash sums of elements known to be malicious that can be stored, for example, in the local data storage 20. In addition, the analyzing module 100 can additionally check the so-called resource signatures, for which it can calculate the hash sums of all previously loaded resources of the analyzed web resource, such as images, cascading style sheets (CSS), JS files, fonts, etc. and to determine whether each calculated hash sum of the resource corresponds to one of the hash sums of resources known to be malicious that can be stored, for example, in the local data storage 20.

Thus, if the analyzing module 100 has determined or discovered, by means of at least one of the html-code analysis methods described above, that the web resource located under a specific reference comprises malicious content, that specific reference belongs to malicious references and, accordingly, the web resource located under that reference, belongs to malicious web resources.

In the non-limiting embodiments of the present technology, the analyzing module 100 is also configured to save information about each malicious web resource detected or installed using at least one of the above-described methods for analyzing web resources for maliciousness in a database of malicious web resources stored in the local data storage 20 (a separate local data storage of interrelated malicious web resources to which the analyzing module 100 can access or with which it can communicate using the communication bus 30, or in the isolated remote data storage of interrelated malicious web resources, which the analyzing module 100 can access or communicate with using the communication module 10 connected to the analyzing module 100 via the communication bus 30, depending on the embodiment of this technique).

In the non-limiting embodiments of the present technology, the analyzing module 100 is also configured to identify web resources associated with each of the malicious web resources detected in the analyzing module 100 using at least one of the above-described methods for analyzing web resources for maliciousness.

In the non-limiting embodiments of the present technology, in order to identify the web resources associated with each of the identified malicious web resources, the analyzing module 100 (i) is configured to have access to the local data storage 20 (separate local data storage or remote data storage, depending on the embodiment, as described earlier in this document) or establishes communication with it using the communication bus 30, ensuring that all other saved references to web resources are obtained therefrom; (ii) establishes a possible link between each malicious reference that comprises the corresponding identified malicious web resource and each of the received reference; and (iii) in case of establishing this link between the references, combines the web resources located under these connected references into a group of interrelated web resources. It shall be noted that each such group of interrelated web resources is formed from one malicious web resource and at least one associated web resource considered as a potentially malicious web resource.

To establish the above-mentioned link between the references (i.e. to identify a web resource parameter common to two or more web resources), the analyzing module 100 performs at least one of the following operations, wherein it establishes at least one of the following for each pair of compared references: (1) whether domain names of the references have a similar spelling (for example, by comparing them character-by-character, calculating the Levenshtein distance between domain names, comparing their hash sums calculated by the analyzing module 100, and/or another technique known in the art); (2) whether the domain names are registered to a same person; (3) whether the same personal data of the registrant, that is, the individual or legal entity to which the domain names are registered, in particular, the telephone number, actual address and/or email address, are indicated for the registered domain names; (4) whether the domain names are located at a same IP address; and (5) whether the references have the same or a similar single web resource pointer "URL" (for example, by comparing them character-by-character, calculating the Levenshtein distance between these "URLs", comparing their hash sums calculated by the analyzing module 100, and/or another methodology known in the art), for example, www.site.com and www.sile.com, with information about the persons to whom the domain names are registered, information about the registrant's personal data (included in the domain name registration data) specified for the registered domain names and the IP addresses at which the registered domain names are located, can be automatically retrieved by the analyzing module 100 using, for example, the online service Whois; in particular, by automatically sending a suitable search query to the online service Whois and extracting the necessary information from the response of the online service Whois or from a web page with the results of the search query by using, for example, a special parser embedded in the analyzing module 100 and analyzing, for example, the text of the response of the online service Whois or the html code of the specified web page.

According to some non-limiting embodiments of the present technology, the above reference relationship can also be established by the analyzing module 100 by comparing, for each pair of compared references, the history of changes in IP addresses, operating services, history of domain names, history of DNS servers, history of changes in DNS records, SSL keys, SSH prints, executable files and other parameters of web resources. It shall be noted that the existence of a connection between the compared references can be established or determined by the analyzing module 100 based on coinciding of at least one of the above parameters of the web resources.

In particular, in some non-limiting embodiments of the present technology, the link between web resources located under the analyzed references can be established by the analyzing module 100 by creating a mathematical model in a form of a graph, wherein the vertices of the created graph correspond to a first web resource and to the second web resource, and the graph edges represent the links between the first web resource and the second web resource based on a web resource parameter common between the first web resource and the second web resource. In these embodiments, the analyzing module 100 may be configured to assign, by, for example, by using a machine learning algorithm, weights to the links between the first web resource and the second web resource based on the web resource parameter common between the first web resource and the second web resource, wherein the number of links based on the web resource parameter common between the first web resource and the second web resources can be limited by a threshold value. The analyzing module 100 is additionally configured to determine: (i) a link coefficient as a ratio of a number of links based the web resource parameter common between the first web resource and the second web resources, (ii) and the weight of each link based on the web resource parameter common between the first web resource and the second web resources, and the analyzing module 100 is further configured to delete links between the first web resource and the second web resource if the value of the link coefficient is lower than a predetermined threshold value.

In the non-limiting embodiments of the present technology, the analyzing module 100 is further configured to analyze the maliciousness of each of the potentially malicious web resources in each group of interrelated web resources to identify malicious web resources among these potentially malicious web resources by implementing at least one of the above described analysis methods of the web resources for maliciousness.

If the malicious nature of at least one of the above potentially malicious web resources in a given group of interrelated web resources is confirmed, the analyzing module 100 stores information about each of these interrelated malicious web resources into the above described malicious web resources database, wherein the data stored for each malicious web resource, comprises, inter alia, data indicating that this malicious web resource is associated with at least one other malicious web resource.

In the non-limiting embodiments of the present technology, it shall be noted that when each new reference to a web resource is received, the analyzing module 100 additionally checks whether the web resource located under the received reference belongs to malicious web resources, for which this analyzing module 100 (*i*) is configured to have access to the above described database of malicious web resources to retrieve information about detected malicious web resources therefrom; (ii) searches for this analyzed web resource among the detected malicious web resources of the obtained data by character-by-character comparison of the reference that comprises the web resource being analyzed with each of the references under which these identified malicious web resources are located to determine whether they at least partially correspond. Thus, if for the received new reference it has been determined that it at least partially corresponds with one of the references under which previously detected malicious web resources are located, then the analyzing module 100 classifies the web resource located under this new reference as pertaining to the malicious web resources. Otherwise, that is, when the new received reference does not even partially correspond with any of the references, under which the previously detected malicious web resources are located, in relation to the web resource located under this new reference, the above analysis for maliciousness is carried out.

In the non-limiting embodiments of the present technology, the analyzing module 100 is also configured to classify or identify the type of threat of each of identified malicious web resources, depending on the malicious content of those malicious web resources detected using at least one of the above web resource analysis methods for maliciousness (each type of threat corresponds to one or another characteristic malicious element, for example, text inviting the user to perform an action, a file of a certain format, scripts, replaced logos, etc.). For example, the analyzing module 100 may identify that a particular malicious web resource is related to threats like phishing, malicious code, fraud, botnet, and/or the like. Thus, for each of the detected malicious web resources, the analyzing module 100 is additionally configured to store data on the type of threat of that malicious web resource in the above-described malicious web resources database, and this stored data on the type of threat will be associated with that malicious web resource.

In the non-limiting embodiments of the present technology, for each detected malicious web resource, the analyzing module 100 is further configured to store, in the above-described database, evidence or grounds obtained by using at least one of the above described methods for analyzing web resources for maliciousness, which allowed to classify this analyzed web resource as malicious web resources, and such stored evidence or grounds for web resource maliciousness will be associated with a respective malicious web resource.

In the non-limiting embodiments of the present technology, the analyzing module 100 is further configured to determine or identify, for each of the detected malicious web resources, at least one authorized entity associated therewith. An authorized entity associated with a given identified malicious web resource may comprise an administrator of a malicious web resource, an owner of the malicious web resource, a domain name registrar, the hosting provider and/or other known individuals and entities that can block the operation of the given malicious web resource or influence the decision to block or suspend the operation of the given malicious web resource.

In order to identify authorized entities associated with each of the identified malicious web resources, the analyzing module 100 is pre-configured or programmed to determine at least one of the owner, administrator, hosting provider and/or domain name registrar associated therewith, as well as their contact details, such as, for example, the actual address, contact telephone number, e-mail address, etc.

In the non-limiting embodiments of the present technology, it shall be noted that the authorized entities, determined or identified by the analyzing module 100, can be determined using any of the known online services, for example the online Whois service, and/or any of the known tools, such as, for example, the tool "nslookup", based on, for example, a domain name used to form a search query. It shall also be noted that the necessary contact details of at least some of the required authorized entities can also be obtained using any of these online services and/or any of these tools, since they are included in the domain name registration data specified for registered domain names in these services and/or tools. In particular, in any of the online services and/or any of the tools, contact details of the owner of a particular web resource can be obtained, namely, his/her contact phone number, the actual address of his/her place of residence and/or his/her email address, as well as (if available) the contact details of the administrator of this web resource, namely his/her contact phone number, the actual address of his/her place of residence and/or his/her email address.

Thus, in accordance with the non-limiting embodiments of the present technology, to determine the owner, administrator, hosting provider and/or the registrar of the domain names associated with the given malicious web resource, and to obtain contact information of the owner and/or administrator of this malicious web resource, the analyzing module 100 is configured to automatically send, for example, to the online service "Whois" a suitable search query, formed based on the domain name, extracted by the analyzing module 100 from the reference under which the given malicious web resource is located, and with the possibility to automatically extract the necessary information from the response of this online Whois service or from a web page with the results of a search query by using, for example, a special parser embedded in the analyzing module 100 and analyzing, for example, the text of the response of the online Whois service or html-code of the specified web page. Thus, from the information received from any of the known online services and/or any of the known tools, the analyzing module 100 can uniquely determine the owner and administrator of domain names for each of the detected malicious web resources, as well as contact information of each of them, and to establish the names of the domain name registrar and hosting provider associated with this malicious web resource.

According to the non-limiting embodiments of the present technology, in the local data storage 20, an updatable database of authorized entities is preliminarily stored for storing information about known authorized entities; in particular, a list of known domain name registrars and their contact information, a list of known hosting providers and their contact information, and a list of the state institutions that can influence the decision to block or suspend functioning of the malicious web resources, etc., and their contact information, wherein the contact details in this database of authorized entities are associated with the authorized entity to which they relate. The analyzing module 100 is configured to access the local data storage 20 or to communicate with it using the communication bus 30, ensuring that at least one of authorized entities of interest associated with a specific malicious web resource is retrieved from the database of authorized entities, based on the names of these entities of interest previously installed by the analyzing module 100 using any of the known online services and/or any of the known tools, as described in more details earlier in this document. Thus, the analyzing module 100 retrieves, from the database of authorized entities, the contact information of the domain name registrar and/or hosting provider previously determined by the analyzing module 100 for the detected malicious web resource using any of the known online services and/or any of the known tools.

In the non-limiting embodiments of the present technology, for each of the detected malicious web resources, the analyzing module 100 is further configured to store the names of authorized entities associated with identified malicious web resources and the contact data of those authorized entities in the malicious web resources database described above. Thus, for each of the detected malicious web resources, the analyzing module 100 stores in the base of malicious web resources the name of the owner of a respective web resource and his/her contact data, the name of the administrator of the respective web resource and his/her contact details, the name of the domain name registrar for the respective web resource and his/her contact details and/or the name of the hosting provider of the respective web resource and its contact information, wherein each contact details in the database of malicious web resources are associated with a respective authorized entity from the above authorized entities to which they relate, and with a specific malicious web resource, with which the authorized entities are associated.

In some non-limiting embodiments of the present technology, for each detected malicious web resource, the analyzing module 100 may be further configured to have access to the local data storage 20 (separate local data storage or remote data storage, depending on the embodiment, as described above in this document) or configured to communicate with it using the communication bus 30 to ensure that the database of malicious web resources comprises information about authorized entities associated therewith, that is, for example, the name of the owner of and his/her contact details, the administrator's name and his/her contact details, the name of the domain name registrar, and its contact details and/or the name of the hosting provider and its contact details. If the analyzing module 100 determines that the database of malicious web resources already comprises all necessary information about authorized entities associated with the given malicious web resource, or at least a part of such necessary information, then the analyzing module 100 does not perform the above described operations related to the direction of search queries to online services and/or tools, and immediately begins the process described below of generation of at least one report of at least one of the authorized entities associated with the given malicious web resource based on specified information on authorized entities from the database of malicious web resources.

In other non-limiting embodiments of the present technology, where the computing device 200 receives, via the communication module 10, the references to web resources known to be malicious from at least one reference source having a unique identifier, by which the analyzing module 100 determines that the received data streams from the specified at least one reference sources comprise references to web resources with malicious and/or illegal content, the analyzing module 100 may not perform the above analysis of the received references for maliciousness, and may immediately send a search query to the above malicious web resource database to determine whether this database comprises information about authorized entities associated with a malicious web resource located under the received reference, and then generating at least one report under at least one authorized entity associated with the given malicious web resource, based on the specified information about authorized entities from the malicious web resource base, as described in more details below. Otherwise, that is, in the absence of information about authorized entities associated with the given malicious web resource in the database of malicious web resources, the analyzing module 100 performs the above described operations related to sending search queries to the online services and/or the tools and obtaining access to the database of authorized entities, followed by the generation of at least one report under at least one authorized entity associated with the given malicious web resource, based on specified information about authorized entities from the database of malicious web resources, as described in more detail below.

It shall be noted that, according to the non-limiting embodiments of the present technology, a predefined set of report templates is preliminarily stored in the local data storage 20, with each report template essentially being a pre-composed letter of appeal informing a given authorized entity about the malicious nature of at least one web resource, thereby requesting a decision for blocking or suspending the operation of the at least one malicious web resource, or influencing making such a decision, wherein each template from this set of report templates is set up to comply with or is associated with one of the known types of threats that may be carried by malicious web resources, and one of the authorized entities. Thus, for each known authorized entity, several report templates can be stored in the local data storage 20, each pre-composed according to only one type of threat from known types of threats.

In the non-limiting embodiments of the present technology, the analyzing module 100 is further configured to generate at least one report for at least one authorized entity after a predetermined period of time (for example, every 10 minutes, once every half hour, every hour, every few hours, once a day, once a week, etc.) or essentially in real time based on the following information:

data on at least one of the malicious web resources associated with one of the specified authorized entities and extracted by the analyzing module 100 from the above described base of malicious web resources, at least based on the name of this authorized entity, and a specific report template corresponding to one of the specified authorized entities and one of the types of threats identified by the analyzing module 100 for the specified malicious web resources, and extracted by it from the malicious web resources base, at least based on information about the specified malicious web resources, in particular, the unique identifier of each of these malicious web resources.

Thus, in the non-limiting embodiments of the present technology, the analyzing module 100 can, for example, generate one report for one of hosting providers and one of domain name registrars, wherein each such report can include information about several specific malicious web resources at once (if these web resources are a threat of the same type, for example, a phishing threat, and are associated respectively with the same hosting provider or domain name registrar), and also specific information on one malicious web resource (if it carries a threat of a type other than other malicious web resources, and/or is associated respectively with a hosting provider or domain name registrar different from other malicious web resources). Additionally, the analyzing module 100 may, for example, generate one report for each of the web resource administrators associated with malicious web resources, information about which was included in the above-described report for the hosting provider and the report for the domain name registrar, at the same time, each report can include information about several specific malicious web resources at once (in case these web resources pose a threat of the same type, for example, a type of "fraud", associated respectively with the same administrator) and information about only one specific malicious web resource (in case it carries a threat of a type different than other malicious web resources, and/or associated respectively with an administrator different from other malicious web resources).

It shall also be additionally noted that the number of reports generated by the analyzing module 100 for each of the authorized entities for malicious web resources associated therewith, corresponds to a number of types of threats carried by these malicious web resources.

In some non-limiting embodiments of the present technology, the analyzing module 100, for each of the malicious web resources, is configured to generate reports for each of the authorized entities associated therewith, in real time, immediately after determining the fact that the web resource located under the received reference belongs to malicious web resources that carry a specific type of threat, as described in more detail earlier in this document.

In some non-limiting embodiments of the present technology, the analyzing module 100 may further add to the at least one of the reports generated by the analyzing module 100 for authorized entities, evidence of the maliciousness of each web resource that was included in this report, wherein the analyzing module 100 may obtain all the necessary evidence from the base of malicious web resources, in which they are associated with a specific malicious web resource.

The analyzing module 100 is also configured to send each above-described generated report for a given authorized entity based on the contact information of the given authorized entity, received by the analyzing module 100 from the malicious web resources database, to inform that given authorized entity of at least one web resource with malicious and/or illegal content.

According to some non-limiting embodiments of the present technology, at least part of the above-described functionality of the analyzing module 100 can be implemented in a form of a functional unit or a module, each of which can be configured to exchange data with the analyzing module 100 and with each other.

As an example, in some non-limiting embodiments of the present technology, the above-described analyzing module 100 may be configured to perform exclusively the above-described operation of detecting malicious web resources in a plurality of web resources located under the received references. The computing device 200 may additionally comprise, for example, a separate module for identifying the interrelated web resources (not depicted) connected to the analyzing module 100 configured to exchange data and configured to perform the above described determining of the web resources associated with each of the malicious web resources detected by the analyzing module 100, and a separate module for informing about malicious web resources(not depicted) connected to the module for identifying interrelated web resources and analyzing module 100 with the possibility of exchange with them data and configured to perform the above operation to determine at least one authorized entity associated with each of the malicious web resources detected by the analyzing module 100 and/or the module for identifying the interrelated web resources, as well as the above described operation for generating at least one report for at least one of the determined authorized entities based on information about the detected malicious web resources associated with this authorized entity and the above operation of sending each generated report to the respective authorized entity on the basis of the contact details thereof. It shall be noted that in these embodiments, the analyzing module 100 may be configured to exchange data with the communication module 10 and the local data storage 20 using the communication bus 30, the interrelated web resource detection module may be configured to exchange data with the local data storage 20 using the communication bus 30 and the module for informing about malicious web resources can be configured to exchange data with the local data storage 20 using the communication bus 30.

As another example, the above-described analysis module 100 may be configured to perform exclusively the above-described operation of detecting malicious web resources in a plurality of web resources located under the received references. The computing device 200 may additionally comprise, for example, a separate module for identifying the interrelated web resources connected to the analyzing module 100 configured to exchange data and configured to perform the above described determining of the web resources associated with each of the malicious web resources detected by the analyzing module 100, as well as a separate module for the establishment of authorized entities (not depicted) connected to the module for identifying interrelated web resources and the analyzing module 100 exchanging data with them and configured to perform the above operation to establish at least one authorized entity associated with each of the malicious web resources detected by analyzing module 100 and/or module for identifying interrelated web resources and a separate report generation module connected to the module of determining of authorized entities with an ability to exchange data and configured to perform the above operation of generating at least one report for at least one of the authorized entities based on data of identified malicious web resources associated with this authorized entity, and the above-described operation of sending each generated report to the respective authorized entity based on contact information of that respective authorized entity. It shall be noted that in these non-limiting embodiments of the present technology, the analyzing module 100 may be configured to exchange data with the communication module 10 and the local data storage 20 using the communication bus 30, and each module for identifying interrelated web resources, the module for determining authorized entities and the reporting module may be configured to exchange data with the local data storage 20 using the communication bus 30.

As another example, in yet other non-limiting embodiments of the resent technology, the analyzing module 100 may be configured to perform the above-described operation of detecting malicious web resources in a plurality of web resources located under the received references, as well as performing the above-described operation of determining web resources associated with each of the identified malicious web resources. The computing device 200 may additionally comprise, for example, a separate module for establishing authorized entities (not depicted) connected to the analyzing module 100 and configured to exchange data and perform the above-described operation of determining at least one authorized entity associated with each of the malicious web resources detected by the analyzing module 100, and a separate reporting module (not depicted) connected to the module for determining authorized entities configured to exchange data and configured to perform the above described operation of generating at least one report for at least one of the determined authorized entities based on information about detected malicious web resources associated with this authorized entity, as well as the above operation of sending each generated report to the respective authorized entity based on the contact details thereof. It shall be noted that in these non-limiting embodiments of the present technology, the analyzing module 100 may be configured to exchange data with the communication module 10 and the local data storage 20 using the communication bus 30, and each of the authorized entities establishment module and the report generating module can be configured to exchange data with the local data storage 20 using the communication bus 30.

In yet further other non-limiting embodiments of the present technology, the analyzing module 100 may comprise at least one submodule configured to implement at least part of the above described functionality of the analyzing module 100, wherein such functional submodules in the analyzing module 100 can be connected to each other to be configured to exchange data thereamong. As an example, the analyzing module 100 may comprise a submodule for identifying malicious web resources configured to perform the above-described operation of identifying malicious web resources in the plurality of web resources located under the received references, submodule for detection of interrelated web resources connected with a submodule for identifying malicious web resources configured to exchange data to perform the above operation of identifying the web resources associated with each of the malicious web resources identified by the malicious web resources detection submodule, as well as the submodule for determining authorized entities connected to the submodule for detecting interrelated web resources and data exchange with them and configured to perform the above operation to determine at least one authorized entity associated with each of the malicious web resources detected by the submodule for detecting malicious web resources and/or submodule for detecting interrelated web resources, and a submodule for generating reports connected to the submodule for determining authorized entities with possibility of exchanging data, and configured to perform the above described operation of generating at least one report for at least one of the established authorized entities based on information about detected malicious web resources associated with this authorized entity, and the above operation of sending each generated report to the appropriate authorized entity on the basis of the contact information of the authorized entity. It shall be noted that in such embodiment of this technique, the submodule for detecting malicious web resources can be configured to exchange data with the communication module 10 and the local data storage 20 using the communication bus 30, and each submodule for detecting interrelated web resources, submodule determining authorized entities and the submodule generating reports can be configured to exchange data with the local data storage 20 using the communication bus 30.

As an example, according to the non-limiting embodiments of the present technology, the analyzing module 100 may comprise a submodule for detecting malicious web resources made with the possibility of performing the above-described operation of detecting malicious web resources in a plurality of web resources located under the received references, submodule of detection of interrelated web resources, connected to the submodule for detecting malicious web resources configured to exchange data and configured to perform the above operation of detection of the web resources associated with each of the malicious web resources identified by the malicious web resources detection submodule, as well as the malicious web resources information submodule connected to the interrelated web resources submodule and the malicious web resources submodule with the possibility of exchanging data therewith and configured to perform the above operation to determine at least one authorized entity associated with each of the malicious web resources identified by the submodule for detecting malicious web resources and/or submodules for identifying interrelated web resources, as well as the above described operation of generating at least one report for at least one for the determined authorized entities based on the detected malicious web resources associated with this authorized entity, and the above operation of sending each generated report to the respective authorized entity based on the contact details thereof. It shall be noted that the submodule for detecting malicious web resources may be configured to exchange data with the communication module 10 and the local data storage 20 using the communication bus 30, and each of the submodules for identifying interrelated web resources and submodule for informing about malicious web resources can be configured to exchange data with the local data storage 20 using the communication bus 30.

As another example, according to other non-limiting embodiments of the present technology, the analyzing module 100 may comprise a submodule for detecting malicious web resources, configured to perform the above-described operation to detect malicious web resources in a plurality of web resources located under received references, as well as the implementation of the above operation of identifying web resources associated with each of the identified malicious web resources, as well as a submodule for determining of the authorized entities connected to the submodule for detection of malicious web resources configured to exchange data and configured to perform the above operation to determine at least one authorized entity associated with each of the malicious web resources detected by the submodule for identifying malicious web resources and a submodule for generating reports, connected with the submodule for determining authorized entities configured to exchange data and configured to perform the above operation of generating at least one report for at least one of the determined authorized entities based on information about detected malicious web resources associated with the determined authorized entity, as well as the above operation of sending each generated report to the respective authorized entity based on the contact thereof. It shall be noted that the submodule for identifying malicious web resources can be configured to exchange data with the communication module 10 and the local data storage 20 using the communication bus 30, and each of the submodules of determining authorized entities and the reporting module can be configured to exchange data with the local data storage 20 using the communication bus 30.

FIG. 3 depicts a flowchart diagram of a method 400 for informing about the malicious nature of a web resource, according to the non-limiting embodiments of the present technology. It shall be noted that the method 400 can be performed using the computing processor of any known computing device, in particular using the above-described analyzing module 100 of the computing device 200 to inform about the malicious nature of the web resources depicted in FIG. 2.

Method 400 depicted on FIG. 3 begins at step 410, where an indication of a plurality of web resources is obtained.

In some non-limiting embodiments of present technology, in order to obtain the indication of the plurality of web resources at step 410, at least one of the following operations shall be performed: (1) sending a request to at least one reference source to obtain therefrom at least one reference to a web resource; (2) receiving messages from at least one computing device to retrieve at least one web resource; (3) receiving messages from at least one mobile device to retrieve at least one reference to a web resource; and (4) entering search queries in at least one search engine using a specific list of keywords to identify contextual advertising in the search results received in response to each search query in each of these search engines to extract at least one reference to a web resource from the identified contextual advertising.

Subsequently, the method 400 proceeds to execution of step 420, wherein malicious web resources are identified in the plurality of web resources, and then to execution of step 430, wherein a set of additional web resources associated with each of the identified, in step 420, malicious web resources are identified.

In some non-limiting embodiments of the present technology, at step 430, at least one of the following is determined in order to identify the set of additional web resources associated with each of the malicious web resources (i.e. to identify a web resource parameter common to two or more web resources), for each pair of web resources including at least one of the set of additional web resources and a respective one of the identified malicious web resources associated therewith: (i) whether the domain names of the web resources have a similar spelling; (ii) whether the domain names are registered to the same person; (iii) whether the same personal data of the registrant, that is, the individual or legal entity to which the domain names are registered, is indicated for the registered domain names of the web resources; (iv) whether the domain names of the web resources are located at the same IP address; and (v) whether the links corresponding to the web resources have the same or similar single web resource index "URL" (for example, www.site.com and www.sile.com).

In other non-limiting embodiments of the present technology, to determine a link between each pair of web resources including at least one of the set of additional web resources and a respective one of the identified malicious web resources associated therewith, at step 430, at least the following operations are performed, wherein: (i) creating a mathematical model in a form of a graph, wherein the vertices of the created graph correspond to a first web resource and a second web resource, and the graph edges are links between the first web resource and the second web resource based on a web resource parameter common for the first web resource and for the second web resource, wherein the number of links based on one web resource parameter of the web resource between the first web resource and the second web resources is limited by a pre-determined threshold value; (ii) assigning, by using a machine learning algorithm, weights to the links between the first web resource and the second web resource based on the parameter common to the first web resource and the second web resource; (iii) determining a link coefficient as a ratio of a number of links based on the web resource parameter common between the first web resource and the second web resource, and the weight of each link based on the web resource parameter common to the first web resource and second web resources; and (iv) removing links between the first web resource and the second web resource in case the value of the link coefficient being lower than a predetermined threshold value.

Subsequently, the method 400 proceeds to execution of step 440, wherein malicious web resources are identified in the set of additional web resources.

In some non-limiting embodiments of the present technology, to identify malicious web resources, at step 420 or step 440, it is determined whether the obtained indication of the plurality of web resources is at least partially related to one of the indications of web resources known to be malicious.

In other non-limiting embodiments of the present technology, in order to identify malicious web resources at step 420 or step 440, the method 400 is further directed to executing at least the following operations: (1) analyzing domain name of a given one of the plurality of web resources for maliciousness using at least one method of analyzing domain names; (2) receiving at least one file from the given one of the plurality of web resources for analyzing its maliciousness using at least one file analysis method; and (3) receiving html-code of the given one of the plurality of web resources for analyzing its maliciousness using at least one method of analyzing the html-code.

In yet other non-limiting embodiments of the present technology, the at least one method of analyzing domain names comprises comparing the domain name with known malicious domain names.

In yet further other non-limiting embodiments of the present technology, the at least one method of analyzing files comprises generating a hash sum associated with the at least one file and calculating the hash sum with a hash sum of one of the known malicious files.

In yet further other non-limiting embodiments of the present technology, the at least one method of analyzing the html-code comprises conducting a search in the html-code for specific keywords indicating malicious nature of the web resource.

Subsequently, method 400 proceeds to execution of step 450, wherein at least one authorized entity, associated with each of the malicious web resources detected at step 420 and/or step 440, is determined.

In some non-limiting embodiments of the present technology, determining at least one authorized entity associated with each of the malicious web resources comprises determining at least one of: an owner, an administrator, a hosting provider and a domain name registrar associated with the at least authorized entity. In other non-limiting embodiments of the present technology, for the owner of a malicious web resource, determined at stage 450, a request is sent to the hosting provider and/or domain name registrar, also determined at stage 450, to receive additional references to the web resources associated with the determined owner.

Subsequently, the method 400 proceeds to execution of step 460, wherein at least one report is generated for at least one of the authorized entities determined at step 450, based on data associated with the at least one identified malicious web resources associated with the at least one authorized entity.

In some non-limiting embodiments of the present technology, the method 400 may include an additional step, wherein a threat type is selected from a predetermined set of types of threat for each malicious web resource identified at step 420 and/or step 440, and during the generating each of the at least one report, a template is used from a predetermined set of report templates, where each template corresponds to at least one of: one of the pre-determined types of threats and one of the established authorized entities.

In other non-limiting embodiments of the present technology, a number of reports generated for each authorized entity corresponds to a number of identified types of threats.

In yet other non-limiting embodiments of the present technology, an evidence document confirming maliciousness of each web resource may be added to each report generated at step 460.

Subsequently, method 400 proceeds to perform the final step 470, wherein each report generated at step 460 is sent to a respective authorized entity based on contact details of the respective authorized entity.

It shall be noted that the claimed method 400 improves the efficiency of informing authorized entities about the identified web resources with malicious and/or illegal content both by expanding the circle of authorized entities receiving such reports and by improving the informational representativeness of each report that can immediately cover the entire group of malicious web resources that are involved by the abusers and carry the same type of threat.

The presented illustrative embodiments, examples and description are provided merely as an aid in understanding of the non-limiting embodiments of the present technoloy and are not intended to be limited in any way. Other possible embodiments will be clear from the above description to persons skilled in the art. The scope of this technique is limited only by the attached claims.

The invention claimed is:

1. A method of generating an indication of a malicious web resource running on a network computing device, the method executable by a supervisory computing device, the method comprising:
   obtaining, by the supervisory computing device, an indication of a plurality of web resources;
   identifying, by the supervisory computing device, malicious web resources in the plurality of web resources,
   identifying, by the supervisory computing device, a set of additional web resources associated with each of the identified malicious web resources, the identifying comprising, for a given pair of web resources including at least one of the set of additional web resources and a respective one of the identified malicious web resources associated therewith, executing:
      determining whether domain names of the given pair of web resources have a similar spelling;
      determining whether the domain names are registered to a same entity;
      determining whether same registrant personal data is specified for the domain names of the given pair of web resources;
      determining whether the domain names of the given pair of web resources are located at a same IP address; and
      determining whether links corresponding to the given pair of web resources have at least a similar uniform locator;
   identifying, by the supervisory computing device, malicious web resources in the set of additional web resources,
   determining at least one authorized entity associated with each of the identified malicious web resources;
   generating at least one report for the at least one authorized entity based on data associated with at least respective one of the identified malicious web resources associated with the at least one authorized entity; and
   sending the at least one report to the at least one associated authorized entity based on contact details associated therewith.

2. The method of claim 1, wherein the determining the at least one authorized entity associated with each of the malicious web resources comprises determining at least one of: an owner, an administrator, a hosting provider and a domain name registrar associated therewith.

3. The method of claim 1, wherein the method further comprises determining a type of threat associated with each identified malicious web resource, the type of threat being selected from a pre-determined set of types of threats.

4. The method of claim 3, further comprising, during the generating the at least one report, using a template from a pre-determined set of report templates, each template corresponding to at least one of: one of the pre-determined types of threats and one of the established authorized entities.

5. The method of claim 4, wherein a number of reports generated for each authorized entity corresponds to a number of identified types of threats.

6. The method of claim 1, wherein the method further comprises generating an evidence document as part of each report, the evidence document for confirming maliciousness of each web resource.

7. The method of claim 1, wherein the identifying malicious web resources comprises determining if a given indication of a given one of the plurality of web resources matches a known malicious reference.

8. The method of claim 7, wherein the identifying, by the supervisory computing device, malicious web resources further comprises executing at least one of:
- analyzing a domain name of the given one of the plurality of web resources for maliciousness using at least one method for analyzing domain names,
- obtaining at least one file from the given one of the plurality of web resources to execute a maliciousness analysis using at least one method of analyzing files; and
- obtaining an html-code of the given one of the plurality of web resources to execute a maliciousness analysis using at least one method of analyzing html-code.

9. The method of claim 8, wherein the at least one method of analyzing domain names comprises comparing the domain name with known malicious domain names.

10. The method of claim 8, wherein the at least one method of analyzing files comprises generating a hash sum associated with the at least one file and comparing the hash sum with a hash sum of one of the known malicious files.

11. The method of claim 8, wherein the at least one method of analyzing html-code comprises conducting a search in the html-code for specific keywords indicating malicious nature of the web resource.

12. The method of claim 1, wherein the identifying the set of additional web resources associated with each of the identified malicious web resources comprises:
- creating a mathematical model in a form of a graph, wherein:
  - vertices of the graph correspond to a first web resource and a second web resource,
  - graph edges are the links between the first web resource and the second web resource based on a web resource parameter common between the first web resource and the second web resource, and wherein a number of links based on the web resource parameter, common between the first web resource and the second web resource, is limited by a predetermined threshold value;
- assigning weights to the links between the first web resource and the second web resource by using a machine learning algorithm, based on the web resource parameter common between the first web resource and the second web resource;
- determining a link coefficient as a ratio of (i) the number of links based on the web resource parameter common between the first web resource and the second web resource and (ii) the weight of each link based on the web resource parameter common between the first web resource and the second web resource; and
- removing links between the first web resource and the second web resource responsive to the link coefficient being lower than a predetermined threshold value.

13. The method of claim 1, wherein the identifying the set of additional web resources associated with each of the identified malicious web resources comprises:
- sending a request to at least one source of indications of malicious web resources to obtain therefrom at least one indication of a web resource;
- receiving messages from at least one third-party computing device that is configured to retrieve the at least one indication of the web resource;
- receiving messages from at least one third-party mobile device that is configured to retrieve the at least one indication of the web resource;
- executing search queries in at least one search engine using a pre-determined list of search keywords to identify contextual advertising in search results generated in response to each request in each of the search engines, such that to extract the at least one indication to the web resource used in the contextual advertising.

14. A computing device for generating an indication of malicious web resources, comprising a memory for storing machine-readable instructions and at least one computing processor, configured to execute computer-readable instructions, which instructions, when executed, are configured to cause the at least one computing processor to execute the method of claim 1.

\* \* \* \* \*